US009616799B1

(12) United States Patent
Smith

(10) Patent No.: US 9,616,799 B1
(45) Date of Patent: Apr. 11, 2017

(54) PNEUMATIC TANK TRAILER

(71) Applicant: Racehorse Investments, L.L.C., East St. Louis, IL (US)

(72) Inventor: David Smith, Alpine, UT (US)

(73) Assignee: Racehorse Investments, L.L.C., East St. Louis, IL (US)

( * ) Notice: Subject to any disclaimer, the term of this patent is extended or adjusted under 35 U.S.C. 154(b) by 0 days.

(21) Appl. No.: 14/957,085

(22) Filed: Dec. 2, 2015

Related U.S. Application Data

(63) Continuation-in-part of application No. 14/515,708, filed on Oct. 16, 2014.

(60) Provisional application No. 61/891,630, filed on Oct. 16, 2013.

(51) Int. Cl.
*B65G 53/04* (2006.01)
*B60P 3/24* (2006.01)

(52) U.S. Cl.
CPC .................................... *B60P 3/243* (2013.01)

(58) Field of Classification Search
CPC .... B60K 3/00; B60K 6/08; B60P 1/60; B65D 25/22; B65D 25/24; B65D 11/28; B65D 88/128; B65D 88/129; B65D 90/12
USPC ........... 406/39, 40, 41, 42, 43, 44, 127, 144; 220/4.14, 564; 296/15; 410/68; D12/95; 280/836–839
See application file for complete search history.

(56) References Cited

U.S. PATENT DOCUMENTS

| | | |
|---|---|---|
| RE8,071 E | 2/1878 | McGarry |
| 1,081,032 A | 12/1913 | Evens |
| 2,038,265 A | 4/1936 | Bradley |
| 2,086,134 A | 7/1937 | Ludwick |
| 2,097,113 A | 10/1937 | Bradley |
| 2,119,671 A | 6/1938 | Francis |
| 2,185,030 A | 12/1939 | Lockwood |
| 2,616,758 A | 11/1952 | Meyers |
| 2,626,813 A | 1/1953 | Edward |
| D170,969 S | 8/1953 | Clough |
| 2,689,462 A | 9/1954 | Brandon |
| 2,721,006 A * | 10/1955 | Knutsen ................ B65D 88/72 222/462 |
| 3,058,753 A | 10/1962 | Carlsen |

(Continued)

FOREIGN PATENT DOCUMENTS

| | | |
|---|---|---|
| CA | 2212020 A1 | 8/1997 |
| WO | 2008125863 A1 | 10/2008 |

OTHER PUBLICATIONS

U.S. Appl. No. 14/957,085, Smith, David, Joe Dillon, Jr.*

(Continued)

*Primary Examiner* — Joseph Dillon, Jr.
(74) *Attorney, Agent, or Firm* — Senniger Powers LLP

(57) ABSTRACT

A pneumatic tank trailer that is structurally reinforced in a fuel efficient manner. The trailer includes a tank defined by hoppers and tank walls. Internal frames are joined to the tank at locations where adjacent hoppers meet. The frames extend circumferentially around the tank interior. In some embodiments, the frames are multi-piece assemblies. In certain embodiments, each frame includes a cross joist portion extending between opposite tank sides at a location spaced apart from the top and bottom of the tank. In some embodiments, front and rear frames include an internal portion that extends along the sides and top of the tank and an external portion that extends underneath the tank.

20 Claims, 20 Drawing Sheets

(56) References Cited

U.S. PATENT DOCUMENTS

| | | | | |
|---|---|---|---|---|
| 3,139,286 A | * | 6/1964 | Johnson | B60P 3/221 105/248 |
| 3,187,766 A | * | 6/1965 | Black | B60P 3/225 137/267 |
| 3,252,431 A | | 5/1966 | Phillips | |
| 3,311,269 A | | 3/1967 | Mendez | |
| 3,325,177 A | | 6/1967 | Arthur | |
| 3,419,310 A | | 12/1968 | Gramlich | |
| 3,543,692 A | | 12/1970 | Stark et al. | |
| 3,679,082 A | | 7/1972 | Gramlich | |
| 3,883,148 A | * | 5/1975 | Miller | B65D 88/26 105/358 |
| 3,917,084 A | | 11/1975 | Swisher, Jr. et al. | |
| 4,188,152 A | | 2/1980 | Kitt | |
| 4,230,048 A | | 10/1980 | Gordon et al. | |
| 4,258,953 A | | 3/1981 | Johnson | |
| 4,348,047 A | | 9/1982 | Harshman | |
| D274,322 S | | 6/1984 | Hayes | |
| 4,606,570 A | | 8/1986 | Neumann | |
| 4,643,475 A | | 2/1987 | Neumann | |
| 4,729,570 A | * | 3/1988 | Welch, Jr. | B60P 3/2225 105/358 |
| 4,741,569 A | | 5/1988 | Sutphen | |
| 4,818,024 A | | 4/1989 | Michel | |
| 4,884,923 A | * | 12/1989 | Wellink | B65D 88/32 137/243 |
| 4,899,901 A | * | 2/1990 | Nickel | B65D 88/54 220/647 |
| 5,064,091 A | * | 11/1991 | Gerhard | B65D 88/128 220/1.5 |
| 5,326,156 A | | 7/1994 | Heider et al. | |
| 5,630,625 A | * | 5/1997 | Shaw | B60G 11/27 180/209 |
| RE35,580 E | | 8/1997 | Heider et al. | |
| 5,782,524 A | | 7/1998 | Heider et al. | |
| 5,819,970 A | | 10/1998 | Solimar | |
| 5,855,456 A | * | 1/1999 | Mueller | B65G 53/525 406/11 |
| 5,911,337 A | | 6/1999 | Bedeker | |
| 6,173,991 B1 | | 1/2001 | Piona et al. | |
| 6,196,590 B1 | | 3/2001 | Kim | |
| 6,286,894 B1 | | 9/2001 | Kingham | |
| 6,457,630 B1 | | 10/2002 | Nilsson | |
| 6,666,498 B1 | | 12/2003 | Whitten | |
| 6,948,887 B1 | * | 9/2005 | Yielding | B60P 1/60 222/399 |
| 6,958,887 B2 | | 10/2005 | Hiraguchi | |
| 7,108,315 B1 | * | 9/2006 | McCloud | B60P 3/2215 280/107 |
| D542,185 S | | 5/2007 | Remington | |
| D544,815 S | | 6/2007 | Williams | |
| D546,245 S | | 7/2007 | Heard | |
| 7,488,030 B2 | | 2/2009 | Nadeau | |
| 7,516,908 B1 | * | 4/2009 | Sack | A62C 3/0207 169/24 |
| 7,651,114 B2 | | 1/2010 | Weber et al. | |
| 7,712,820 B1 | | 5/2010 | Kyle | |
| 7,795,837 B1 | | 9/2010 | Haun et al. | |
| 7,967,369 B2 | | 6/2011 | Davidson | |
| 8,025,329 B1 | | 9/2011 | Kron | |
| 8,066,318 B2 | | 11/2011 | Mazzarelli et al. | |
| 8,082,698 B2 | | 12/2011 | Drake | |
| 8,186,745 B2 | | 5/2012 | Graham | |
| D662,461 S | | 6/2012 | Fu et al. | |
| 8,308,213 B1 | | 11/2012 | Sharkey | |
| 8,573,680 B2 | | 11/2013 | Smith | |
| D716,701 S | | 11/2014 | Beelman, III | |
| 9,266,459 B2 | * | 2/2016 | Yielding | B60P 1/56 |
| 2003/0075915 A1 | | 4/2003 | Kim | |
| 2003/0132644 A1 | | 7/2003 | Crews | |
| 2006/0049661 A1 | | 3/2006 | Mazzarelli et al. | |
| 2008/0073895 A1 | | 3/2008 | Herman et al. | |
| 2008/0190929 A1 | | 8/2008 | Gloor et al. | |
| 2008/0211259 A1 | | 9/2008 | Nadeau | |
| 2008/0265617 A1 | | 10/2008 | Davidson | |
| 2009/0085394 A1 | | 4/2009 | Lemmons | |
| 2009/0145905 A1 | | 6/2009 | Kim | |
| 2010/0308063 A1 | | 12/2010 | Pu et al. | |
| 2010/0320725 A1 | | 12/2010 | Thorpe, Sr. | |
| 2011/0049207 A1 | | 3/2011 | Hufgard | |
| 2011/0198145 A1 | | 8/2011 | Bullis | |
| 2011/0209418 A1 | | 9/2011 | Drake | |
| 2014/0353999 A1 | * | 12/2014 | Yielding | B60P 1/56 296/24.3 |
| 2015/0137501 A1 | * | 5/2015 | Kibler | B60P 3/221 280/837 |
| 2015/0314815 A9 | * | 11/2015 | Yielding | B60P 1/56 296/24.3 |

OTHER PUBLICATIONS

Product News, Sep. 2013, prior Fruehof tank trailer configuration, http://www.1087vehicles.org/New%20Products/13_sep.php; printed Apr. 14, 2015.

Robert Lafrenière Truck Pictures—Bulk Hauler Trucks, four pages, last updated Feb. 28, 2014.

* cited by examiner

PNEUMATIC TANK TRAILER

CROSS REFERENCE TO RELATED APPLICATION

This application is a continuation-in-part of U.S. patent application Ser. No. 14/515,708, filed Oct. 16, 2014, which claims the benefit of U.S. Provisional Patent Application No. 61/891,630 filed Oct. 16, 2013. Each of these applications is hereby incorporated by reference in its entirety.

FIELD OF INVENTION

The present invention relates to a pneumatic tank trailer.

BACKGROUND OF INVENTION

Pneumatic tank trailers are commonly used to haul a variety of dry bulk materials, such as, for example, lime products, cement, fly ash, food products, etc. The pneumatic tank trailers include a tank that receives the dry bulk materials. The materials are loaded through manholes located on a top of the tank. The tank typically includes pressurizing systems to facilitate unloading of the dry bulk materials. The tank typically includes one or more hoppers positioned along an approximate bottom surface of the tank and trailer. These hoppers promote the discharge of the dry bulk materials from the trailer. Aeration systems engaged to the hoppers may also assist in fluidizing the dry bulk materials. The hoppers typically include angled walls that lead to a discharge pipe or conduit. A combination of the aeration systems, the pressurizing systems, blowers, and gravity cause the dry bulk materials to discharge from the discharge pipe or conduit.

Pneumatic tank trailers are almost always equipped with at least one, and typically several, hose tubes that store hoses that connect the tank trailer to the silo equipment. The hose tubes are generally an added component that merely fastens to the tank with no other purpose than to house the hoses.

Pneumatic tank trailers generally have round or ovular cross-sections which accommodate the pressure received from the pressurizing system. However, filling such round or ovular tanks with materials (many materials commonly hauled in a pneumatic trailer have an approximate 45 degree angle of repose), may leave a substantial amount of dead, unused space in the trailer. The dead space in the trailer is undesirable as it increases the time necessary to pressurize the tank, and leaves unused capacity in the trailer that still needs to be hauled. Hauling dead space is inefficient. By reducing dead space in the tank of the trailer, a trailer is made more efficient since the trailer can be filled more to capacity. Often, drivers will try to minimize the amount of dead space in the trailer by shaking down the load. Shaking down the load is done by pressurizing the tank, and/or moving the trailer forward and then stopping abruptly, causing the materials in the tank to shift. This fills some of the dead space and allows more material to be loaded through the manholes in order to top off the trailer. Some drivers will shake down the load multiple times. Shaking down a load is undesirable because it takes a significant amount of time and is hard on the trailer. It is an aspect of the present invention to provide a trailer that can be loaded to capacity with single pass loading and/or can be loaded to capacity without shaking the load down.

A front region of a conventional pneumatic tank trailer is generally exposed to oncoming air during travel. The front region of the conventional pneumatic tank trailer faces generally perpendicular to the direction of travel, and the front region is exposed to the oncoming air and creates turbulence, as the air strikes against various plumbing fittings and structural members positioned at the front of the trailer. This front region often includes the structural and support members as well as plumbing, parts of plumbing, fittings, valves, and pipes for the pressurizing systems. When the trailer is moving, wind and air strike the front of the trailer, plumbing, fittings, and pipes thus creating turbulence and drag. This turbulent air is directed about the trailer, resulting in reduced fuel efficiency for the vehicle towing the pneumatic tank trailer.

External vertical ribs are often positioned generally perpendicular to a length of a tank on pneumatic trailers. The external vertical ribs are usually positioned on the external surface of the tank generally perpendicular to a length of a tank. The external vertical ribs generally extend all the way around the tank. The external vertical ribs may be used to reinforce a joint between adjacent segments, or reduce the stress in the tank as it is pressurized. The external vertical ribs cause wind resistance and drag, and thus reduce fuel efficiency.

SUMMARY OF INVENTION

A pneumatic tank trailer with improved aerodynamic efficiency is described. A pneumatic tank trailer with several functional improvements is described.

The pneumatic tank trailer includes a tank. A front end cover is positioned over a front portion of the pneumatic tank trailer. The front end cover partially covers and attaches to a front end cone of the tank. The front end cover also covers plumbing and fittings for a pressurization system of the pneumatic tank trailer. The front end cover improves the aerodynamics of the trailer by providing a smooth surface with a large radius transition from the front cover to the tank.

In one aspect, a pneumatic tank trailer comprises a tank having front and rear ends spaced apart along a longitudinal axis. The tank comprises a plurality of hoppers each having a top end portion and bottom end portion. The top end portions of adjacent hoppers are arranged next to each other and define hopper joint areas. The bottom end portions of the hoppers are spaced apart along the longitudinal axis of the tank. A tank wall extends along the longitudinal axis of the tank and defines an interior of the tank. The tank wall includes opposite first and second side wall portions and a top wall portion extending between the first and second side wall portions. The first and second side wall portions of the tank have bottom edge portions that are joined to the top end portions of the hoppers. A plurality of internal frames is joined to the tank in spaced apart relationship along the longitudinal axis of the tank to support the tank against internal pressures therein. Each internal frame comprises a bottom portion joined to a respective hopper joint area of the tank, opposite first and second side portions joined to the first and second side wall portions of the tank, respectively, and a cross joist portion extending between the opposite side wall portions of the tank in spaced apart relationship with the bottom portion of the respective internal frame and the top wall portion of the tank. A carriage is connected to and supporting the tank for movement over a road.

In another aspect, a pneumatic tank trailer comprises a carriage for movement over a road and a tank connected to and supported by the carriage and having front and rear ends spaced apart along a longitudinal axis. The tank comprises a plurality of hoppers each having a top end portion and bottom end portion. The top end portions of adjacent hoppers are arranged next to each other and define hopper joint areas. The bottom end portions of the hoppers are spaced apart along the longitudinal axis of the tank. A tank wall extends along the longitudinal axis of the tank and defines an interior of the tank. The tank wall includes opposite first and second side wall portions and a top wall portion extending between the first and second side wall portions. The first and second side wall portions of the tank have bottom edge portions that are joined to the top end portions of the hoppers. A plurality of internal frames are joined to the tank in spaced apart relationship along the longitudinal axis of the tank to support the tank against internal pressures therein. Each of the internal frames is longitudinally aligned with a respective hopper joint area and extends circumferentially around the tank interior. Each internal frame has a bottom portion joined to the respective hopper joint area. First and second side portions are joined to the first and second wall portions, respectively, and a top portion is joined to the top wall portion. Each internal frame comprises a plurality of frame members that are separately joined together to form the respective internal frame. At least some of the frame members extend circumferentially around the tank interior and continuously contact the tank wall and respective hopper joint area.

In another aspect, a pneumatic tank trailer comprises a carriage for movement over a road and a tank connected to and supported by the carriage and having front and rear ends spaced apart along a longitudinal axis. The tank comprises a plurality of hoppers including a front hopper adjacent the front end of the tank and a rear hopper adjacent the rear end of the tank. Each of the hoppers have a top end portion and bottom end portion, the top end portions of adjacent hoppers arranged next to one another and defining hopper joint areas such that the bottom end portions of the hoppers are spaced apart along the longitudinal axis of the tank. A tank wall extends along the longitudinal axis of the tank and defines an interior of the tank. The tank wall includes a front wall portion defining the front end of the tank, a rear wall portion defining the rear end of the tank, opposite first and second side wall portions, and a top wall portion extending between the first and second side wall portions. The first and second side wall portions of the tank have bottom edge portions that are joined to the top end portions of the hoppers. The front wall portion is joined to the top end portion of the front hopper at a front joint area and the rear wall portion is joined to the top end portion of the rear hopper at a rear joint area. An internal frame for each hopper joint area is joined to the tank in longitudinal alignment with the hopper joint area and extends circumferentially around the tank interior. A front frame is joined to the tank in longitudinal alignment with the front joint area and extends circumferentially around the tank interior. The front frame has an internal portion extending inside the tank along the first side wall portion, top wall portion, and second side wall portion of the tank wall and an external portion extending underneath the tank along the front joint area. A rear frame is joined to the tank in longitudinal alignment with the rear joint area and extends circumferentially around the tank interior. The rear frame has an internal portion extending inside the tank along the first side wall portion, top wall portion, and second side wall portion of the tank wall and an external portion extending underneath the tank along the rear joint area.

Other objects and features will be in part apparent and in part pointed out hereinafter.

BRIEF DESCRIPTION OF DRAWINGS

Corresponding parts are given corresponding reference numbers throughout the drawings.

DETAILED DESCRIPTION OF INVENTION

Figure 1:
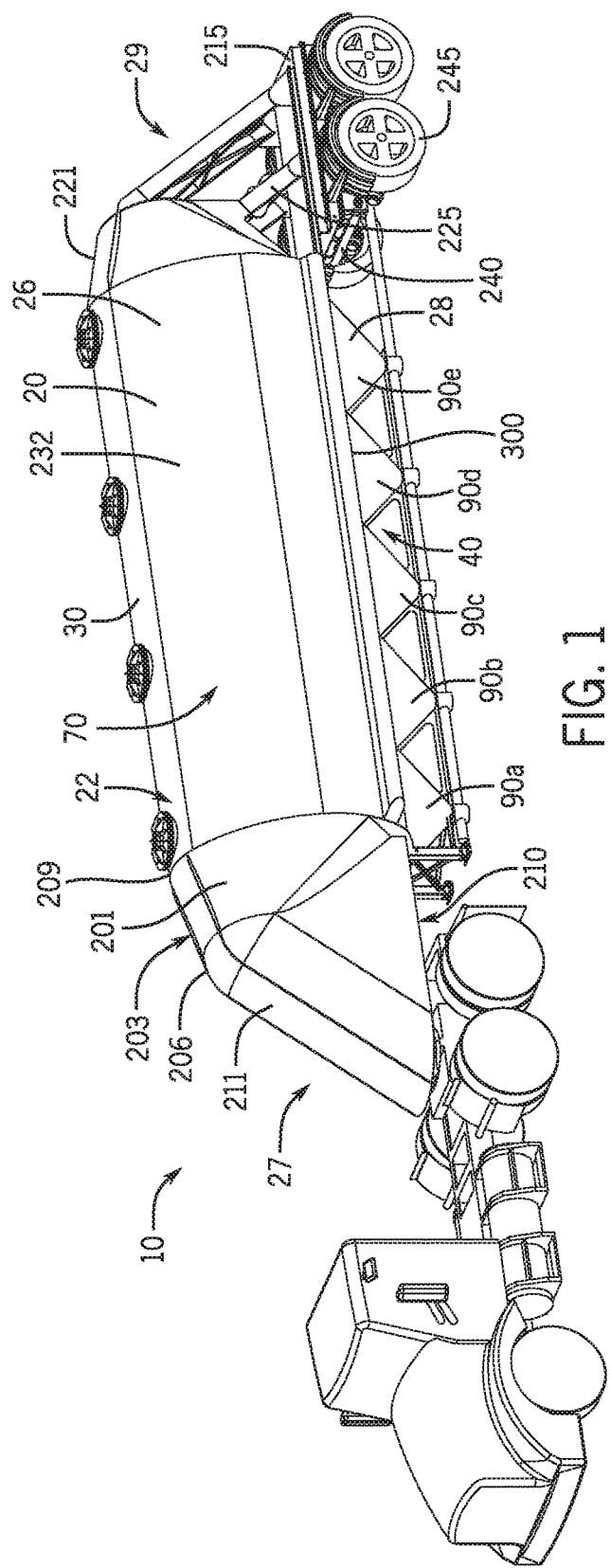
FIG. 1 is a perspective view of the pneumatic tank trailer and tractor combination.

A pneumatic tank trailer 10 and components thereof are shown in FIGS. 1-14. The pneumatic tank trailer 10 includes a tank 20 that defines an interior volume 25. The tank 20 is the holding section of the pneumatic tank trailer 10 that can be pressurized. The pneumatic tank trailer 10 includes a front end portion 27 that is proximate a king pin of the pneumatic trailer 10. The king pin connects the pneumatic tank trailer 10 to the tractor or other towing vehicle. The pneumatic tank trailer 10 includes a rear end portion 29 proximate rear wheels 245 of the pneumatic tank trailer 10. The interior volume 25 may be pressurized to facilitate unloading of the dry bulk material.

The pneumatic tank trailer 10 includes an aerodynamic shape that improves fuel efficiency. The pneumatic tank trailer 10 may be designed for traveling over one million miles during its lifetime, and aerodynamic efficiency results in significant fuel costs savings. As described below, the pneumatic tank trailer 10 includes several features to reduce weight and improve aerodynamic efficiency and thereby reduce fuel costs. The tank trailer 10 also includes several features to improve the operation and function of the tank trailer 10.

The pneumatic tank trailer 10 has a generally smooth top surface and sides, with no external vertical ribs aligned generally perpendicular to the direction of travel. The generally smooth top surface and sides help increase aerodynamic efficiency.

Figure 6:
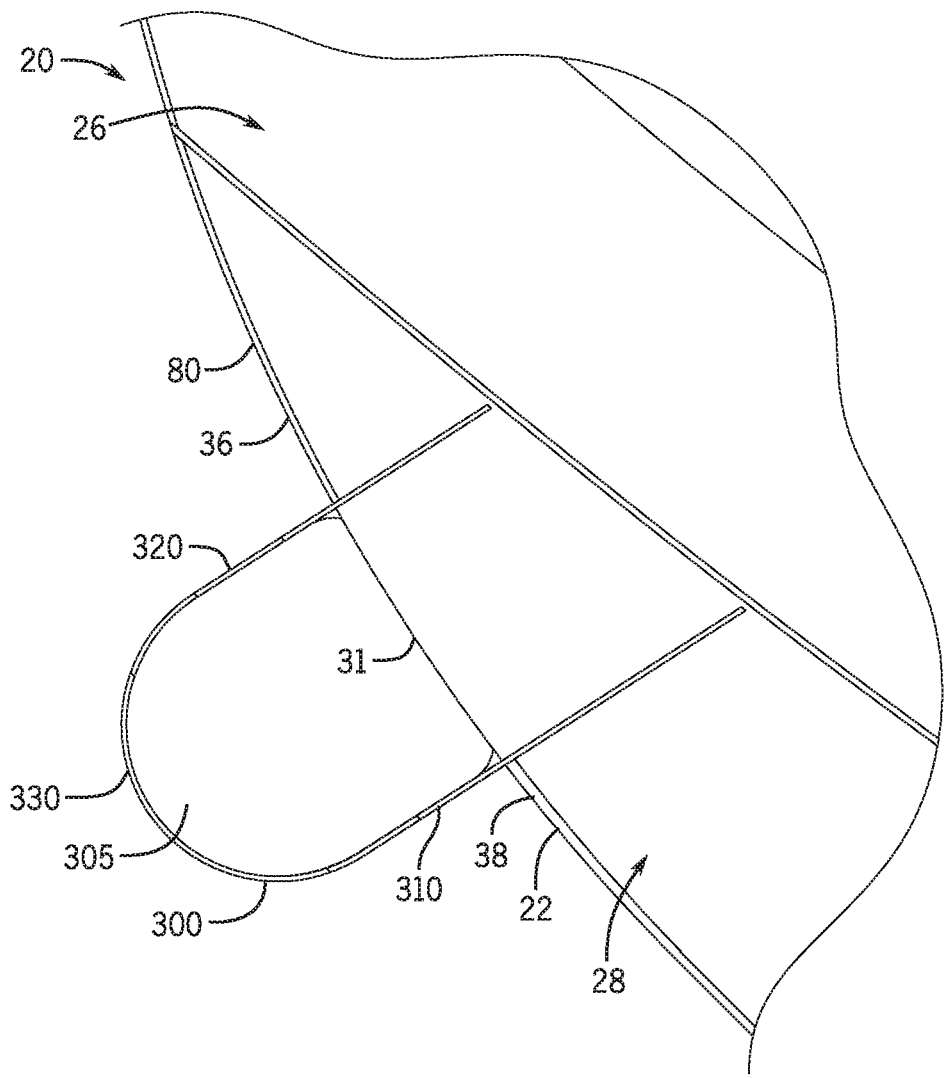
FIG. 6 is a sectional view of the tank and the hose tube.

The tank 20 includes a barrel portion 26 generally positioned above a hopper portion 28. As shown in FIG. 6, the barrel portion 26 and the hopper portion 28 are generally joined together along a joining region 31. The hopper portion 28 includes an upper hopper portion wall 38 that engages a lower barrel portion wall 36 of the barrel portion 26 at the joining region 31. The engagement between barrel portion 26 and the hopper portion 38 at the joining region 31 may include a seam, intersection, or other interconnection.

The front end portion 27 of the pneumatic tank trailer 10 also contributes to the improved aerodynamic efficiency. The front end portion 27 faces the direction of travel, and the front end portion 27 is generally exposed to the oncoming air. A front end cover 211 generally encloses the front end portion 27 of the trailer 10. A front of the tank 20 includes a front end cone 201. The front end cone 201 is integral with the barrel portion 26 of the tank 20. The front end cover 211 blends into the front end cone 201.

The front end cover 211 covers fittings and structural members to improve the aerodynamic efficiency of the pneumatic tank trailer 10. The combination of the front end cone 201 and the front end cover 211 provides for less turbulent air to pass over and to the sides of the pneumatic tank trailer 10. A seam 206 between the front end cone 201 and the front end cover 211 is made generally smooth. Likewise, a transition 209 between the front end cone 201 and the remainder of the tank 20 is made generally smooth.

Figure 2:
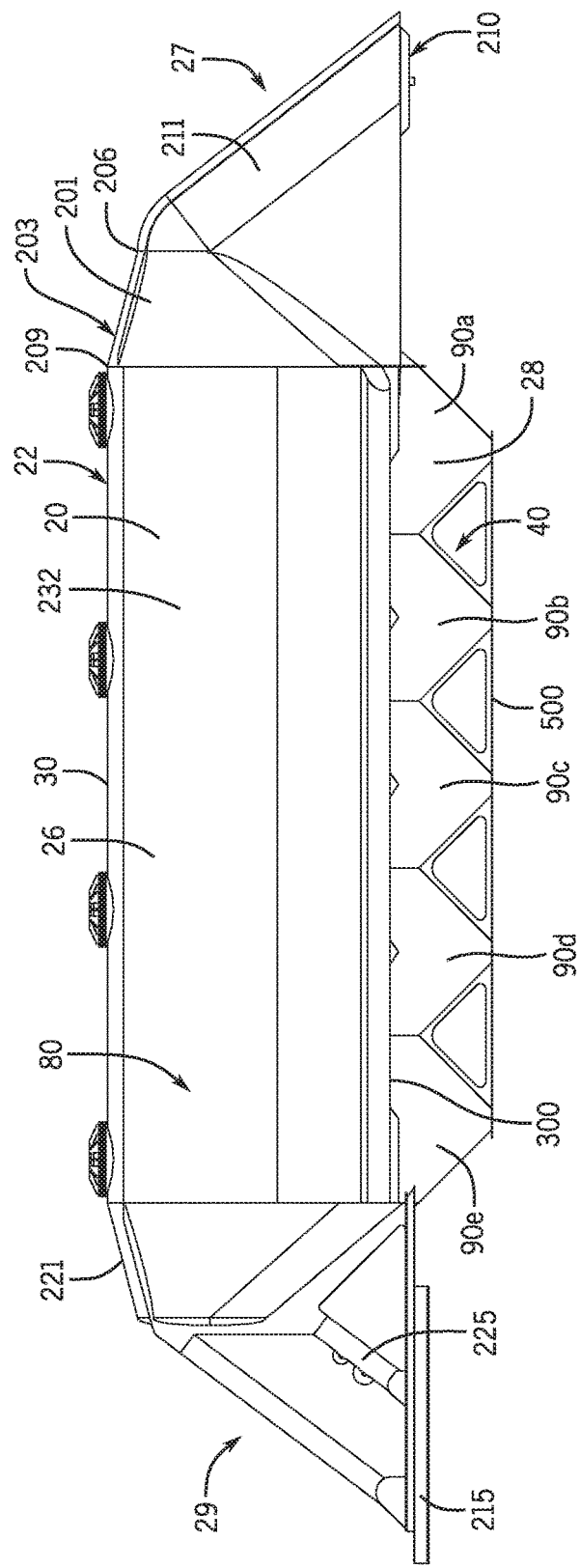
FIG. 2 is a side view of the tank.

The pneumatic tank trailer 10 includes a top surface 30 generally opposite of a bottom surface 40. The bottom surface 40 is formed from one or more hoppers 90a-e of the hopper portion 28. The top surface 30 of the tank 20 is generally flat and has zero slope longitudinally for most of or a majority of its length. The top surface 30 blends into the front end cone 201 at the transition 209. With reference to FIG. 2, a side view of the trailer 10 shows the sloping shape of the front end cone 201.

The barrel portion 26 of pneumatic tank trailer 10 also includes a first side surface 70 generally opposite of a second side surface 80. The barrel portion 26 may be welded or otherwise mechanically attached to or over the hoppers 90a-e of the hopper portion 28 in an air tight fashion. The side surfaces 70 and 80 provide a smooth, aerodynamic surface that attaches to upper edges of the hoppers 90a-e. The first and second side surfaces 70 and 80 of the pneumatic tank trailer 10 are generally smooth, with no external vertical ribs, to help increase aerodynamics. The side surfaces 70 and 80 transition into the lower barrel portion wall 36, which joins with the hopper portion 28 at the joining region 31.

The front end portion 27 of the pneumatic tank trailer 10 will now be further described. The front end cone 201 is generally positioned forward of the first hopper 90a. The front end cone 201 may include a sloping external surface 203. The front end cover 211 connects a front deck 210 and the front end cone 201. The front end cover 211 defines an interior that encloses or covers plumbing and structural members of the front deck 210. The front end cone 201 provides an aerodynamic transition between the front end cover 211 and the top surface 30 of the tank 20.

The pneumatic tank trailer 10 includes the front end cone 201 that slopes down at an angle between approximately 5 and 15 degrees from a horizontal plane. The front end cone 201 slopes down from the top surface 30 of the barrel portion 26 and in from the side surfaces 70 and 80 of the barrel portion 26 at an angle of approximately between 5 and 15 degrees. The front end cover 211 comprises a large radius to allow air to flow smoothly over the front end cover 211 and front end cone 201 of the front end portion 27. The large radius allows for air to flow smoothly over front end portion 27 and the outer surface 22 of the tank 20, reducing the aerodynamic drag.

The front end cover 211 blends right into the front end cone 201, which then transitions into an outer surface 22 of the tank 20 with no obstructions. This blending of the surfaces of the front end cover 211, the front end cone 201, and the barrel portion 26 of the tank 20 allows for smooth airflow over the outer surface 22 of the tank 20, and also reduces air flow from becoming detached from the tank 20 as the air flows over the tank 20.

The rear end portion 29 of the pneumatic tank trailer 10 will now be described with reference to FIG. 2. A rear of tank 20 includes a rear end cone 221. The rear end cone 221 is integral with the barrel portion 26. The rear end cone 221 is generally rear of the fifth hopper 90e. The rear end cone 221 also slopes down from the top surface 30 and in from the side surfaces 70 and 80 of the barrel portion 26 of the tank 20 at an angle between approximately 5 and 15 degrees from a horizontal plane. The rear end cone 221 attaches to a rear deck 215 via supports 225. The rear end cone 221 assists in providing an aerodynamic profile for the pneumatic tank trailer 10. At the rear end portion 29, the hopper 90e joins with a rear chassis 240 and the rear wheels 245.

The hopper portion 28 of the tank 20 includes the one or more hoppers 90a-e. With reference to FIG. 2, the hopper portion 28 includes the first hopper 90a, a second hopper 90b, and a third hopper 90c, a fourth hopper 90d, and a fifth hopper 90e. The first hopper 90a is the most forward hopper, i.e., it is the hopper closest to the tractor. The fifth hopper 90e is the most rear hopper. In other aspects, the tank 20 may include fewer or additional hoppers 90. For example, the tank 20 may include one, two, three, four, six, seven or more hoppers 90.

At a bottom surface 40 of the tank 20, the first hopper 90a leads to an opening 95a, the second hopper 90b leads to an opening 95b, the third hopper 90c leads to an opening 95c, the fourth hopper 90d leads to an opening 95d, and the fifth hopper 90e leads to an opening 95e. Each of the hoppers 90a-90e includes angled walls 98a-e leading to the openings 95a-e. The angled walls 98a-e each have a cone shape that funnels the materials to the openings 95a-e.

Figure 3:
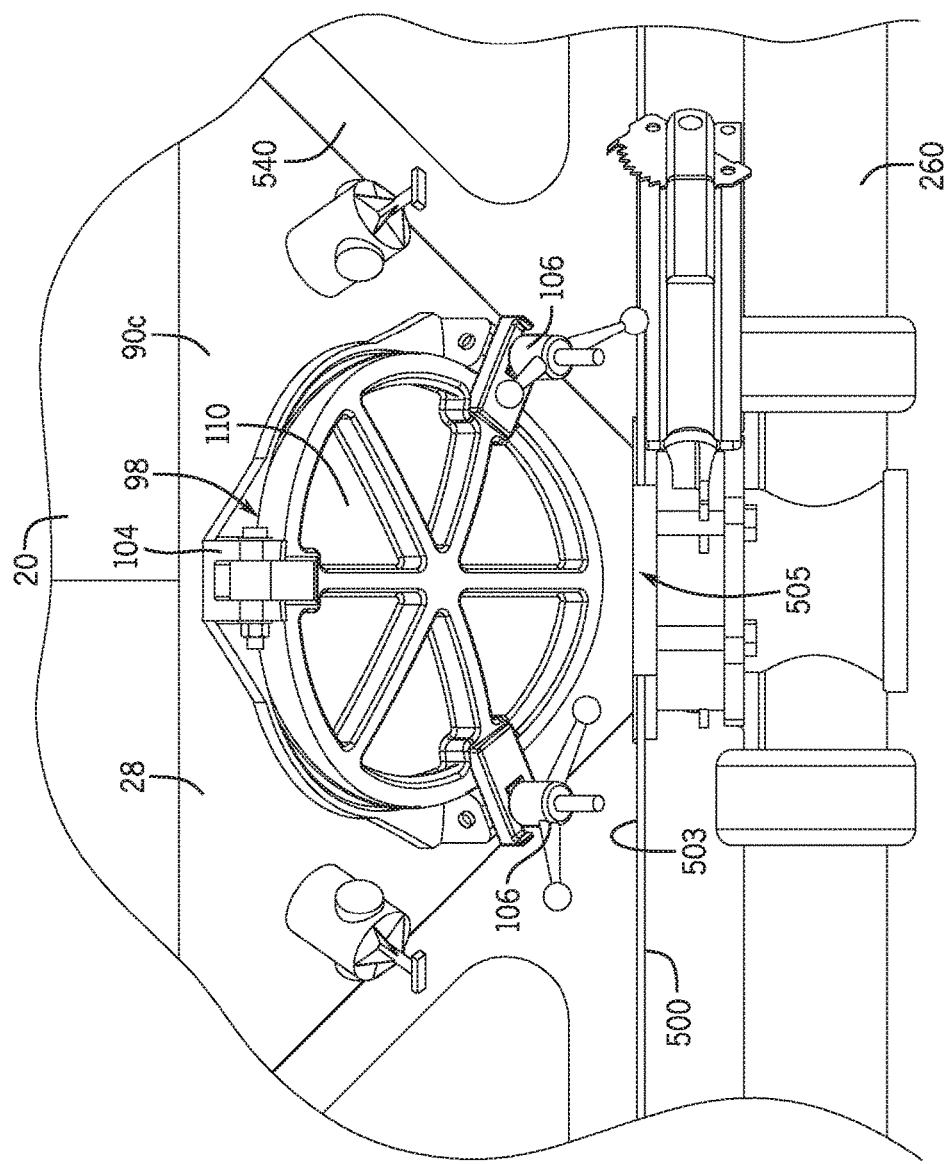
FIG. 3 is a view of the gravity unload hatch.
Figure 4:
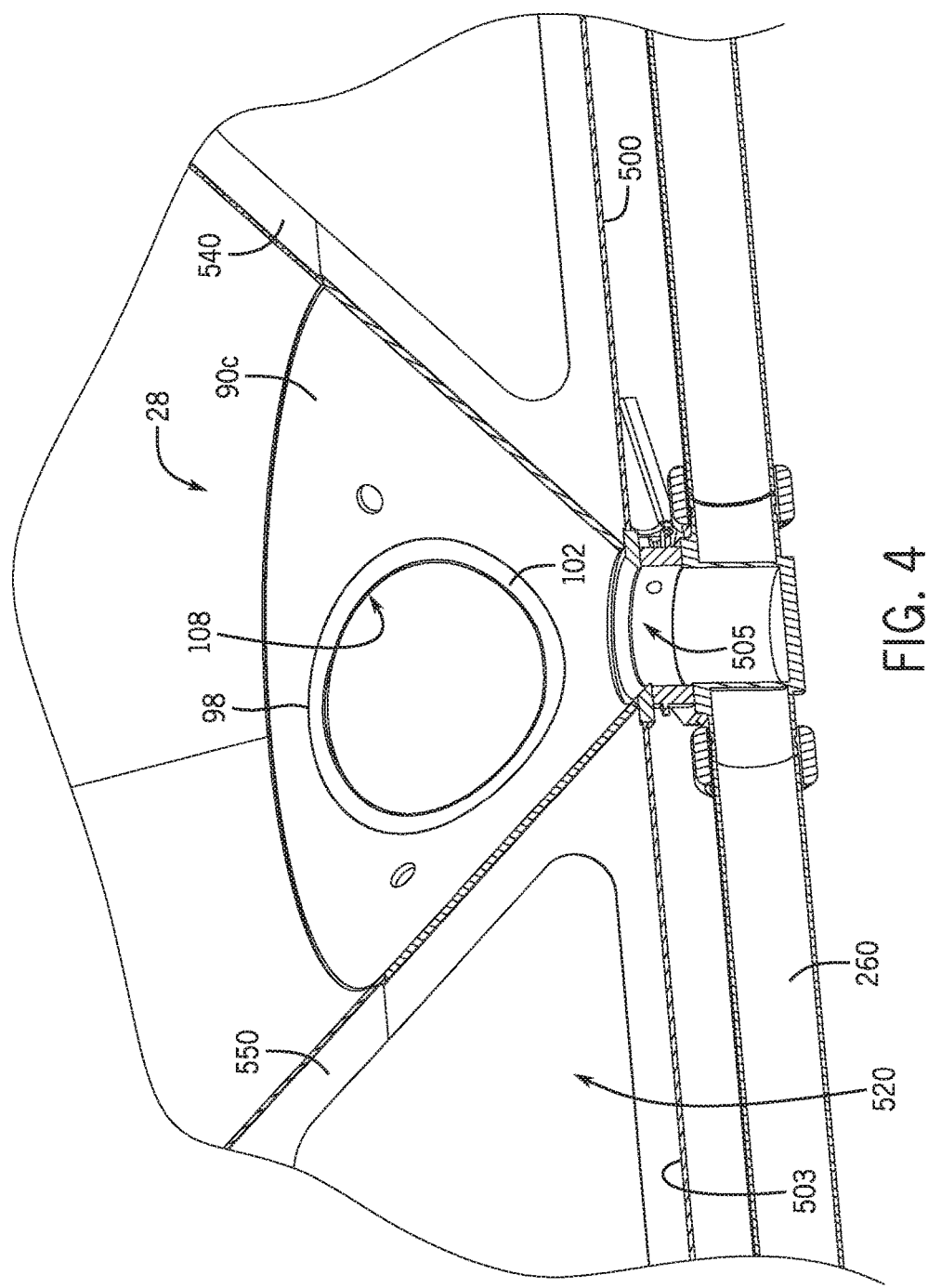
FIG. 4 is a sectional view of the hopper showing the gravity unload hatch from the inside.

An improved gravity unload hatch 110 for the hoppers 90a-e will now be described with reference to FIGS. 3 and 4. One or more of the hoppers 90a-e include the gravity unload hatch 110 for accelerated gravity unloading or dumping of the materials from the tank 20. The gravity unload hatch 110 offers a faster alternative for dumping materials to ground level or areas beneath the tank 20 than conventional unloading methods for a pneumatic trailer. The gravity unload hatch 110 opens and closes a side opening 102 of the hoppers 90a-e. The gravity unload hatch 110 does not impede typical unloading of pneumatic trailer 10. The side opening 102 of the hopper 90 may be fully opened by pivoting the gravity unload hatch 110 on a pivot assembly 104. The gravity unload hatch 110 is attached to the hopper 90a-e over a top edge 98 of the side opening 102. The pivot assembly 104 is affixed to the hopper 90a-e above the top edge 98 of the side opening 102. With the gravity unload hatch 110 attached to the hopper 90a-e at the pivot assembly 104 near the top edge 98 of the side opening 102 and with the gravity unload hatch 110 and opening upwards (towards the top of the tank trailer 10), the material from within the hopper 90a-e does not fall out over the gravity unload hatch 110. As such, the gravity unload hatch 110 does not impede or slow the flow of materials from the side opening 102.

The gravity unload hatch 110 also includes swing bolts 106 that provide for the gravity unload hatch 110 to press tightly against a seal (not shown) creating an airtight barrier as the gravity unload hatch 110 seals closed over the side opening 102. The gravity unload hatch 110 does not deflect further than the compression of the internal seal when the tank 20 is pressurized. The gravity unload hatch 110 mounts flush with an interior surface 108 of the hoppers 90a-c. The gravity unload hatch 110 also has a smooth inner surface that allows for easier cleaning of the hopper 90a-e and prevents material buildup in or around the gravity unload hatch 110.

Hose tubes 300, which strengthen the tank 20, will now be described with reference to FIGS. 5-7. The pneumatic tank trailer 10 includes one or more hose tubes 300 as structural members. The one or more hose tubes 300 act as a sheath or storage area for hoses that connect the tank trailer 10 to the silo equipment. The hoses are stored in the hose tubes 300 during travel from one location to another location.

The one or more hose tubes 300 may strengthen the joining region 31 between the barrel portion 26 and the hopper portion 28. The pneumatic tank trailer 10 may include one hose tube 300 along the first side surface 70 of the tank trailer 10 and a second hose tube 300 along the second side surface 80. The one or more hose tubes 300 are engineered into the tank 20 in order to strengthen the tank 20.

Figure 5:
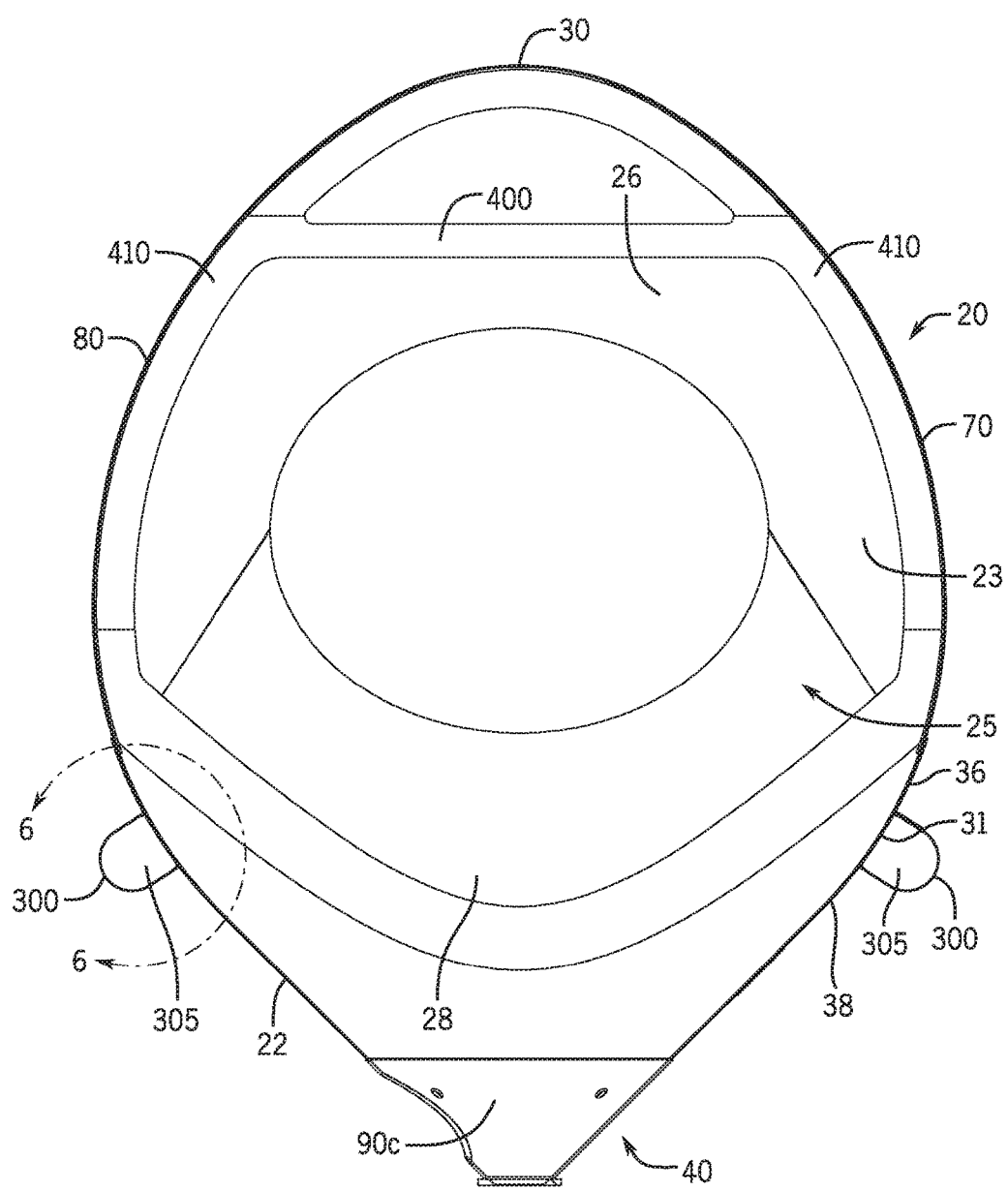
FIG. 5 is a sectional view of the tank.
Figure 7:
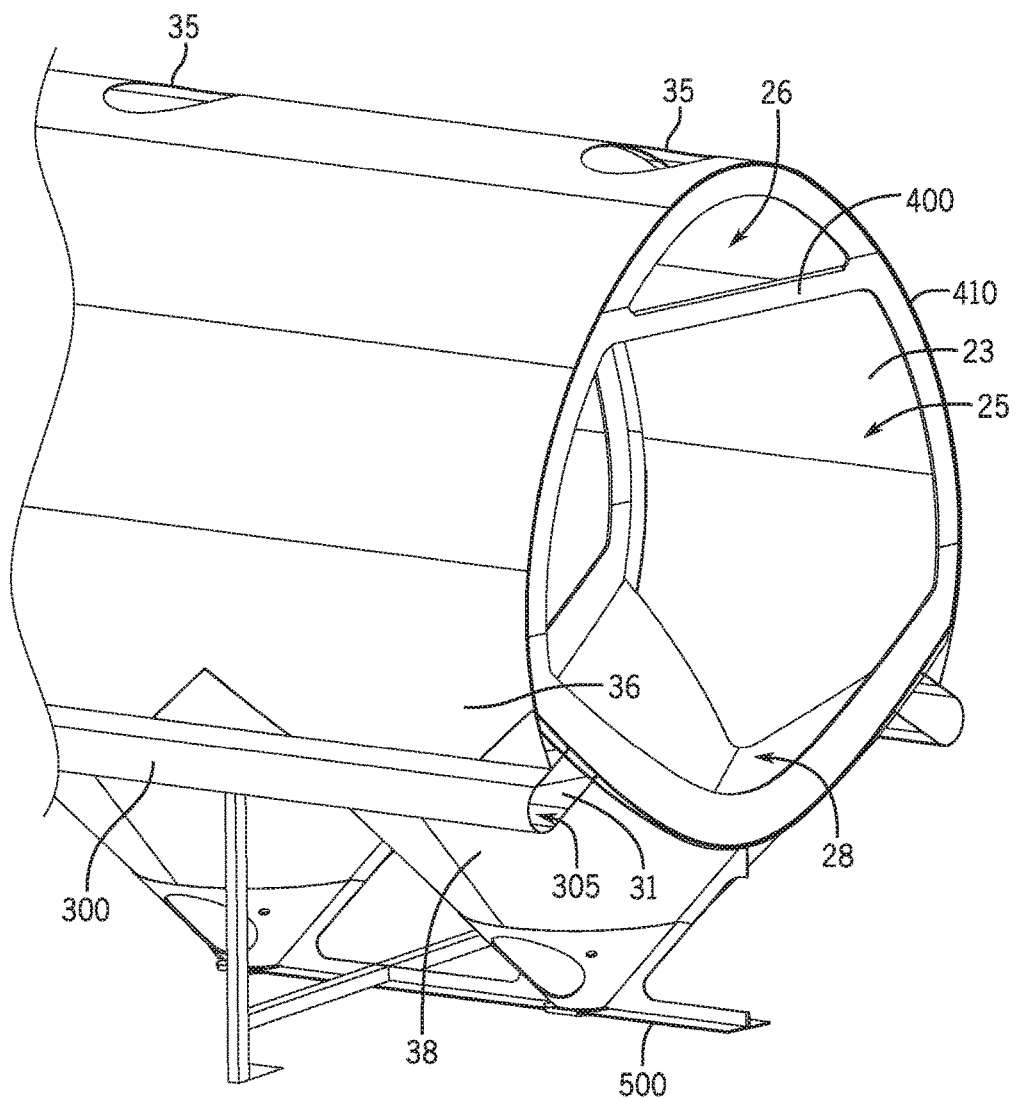
FIG. 7 is a sectional view of the tank and the hose tube.

The hose tubes 300 are shown in detail in FIGS. 5-7. At the joining region 31, the hopper portion 28 curves in and out along a length of the tank 20. Due to the curved outer exterior of the hoppers 90a-e, the joining region 31 includes an irregular or undulating border between the hopper portion 28 and the barrel portion 26. Along the length of the hose tubes 300, the hose tubes 300 may alternatingly connect to the barrel portion 26 and to the hopper portion 28. The pneumatic tank trailer 10 integrates the hose tubes 300 into the tank 20 to add stiffness to the intersection of the hoppers 90a-e and the remainder of the tank 20 and to the intersection of adjacent hoppers 90a-e. These intersections are prone to high stress and cracking, as the shape does not lend itself well to holding pressure. The use of the hose tubes 300 as a structural member decreases this stress without appreciably increasing the weight of the tank trailer 20. Further, as the hose tubes 300 are attached to the tank 20, the interactions of the hoppers 90a-e and the hose tubes 300 cause vortices and/or a recirculation zone to form in an airflow region between the hoppers 90a-e that decreases the aerodynamic drag of the tank trailer 10 when being pulled at highway speed by a tractor.

The hose tubes 300 include an inner open region 305 to contain or store the hoses. With specific reference to FIG. 7, the hose tubes 300 include a lower edge 310 and an upper edge 320. The lower edge 310 transitions into a central curved region 330 that further transitions into the upper edge 320. The lower and upper edges 310 and 320 may include a generally flat cross-section before the lower and the upper edges 310 and 320 transition into the central curved region 330. The lower and upper edges 310 and 320 engage the outer surface 22 of the tank 20. For example, the lower and upper edges 310 and 320 may be welded, riveted, or otherwise mechanically engaged to the tank 20 in an airtight fashion. The lower edge 310 may engage the upper hopper portion wall 38 and the upper edge 320 may engage the lower barrel portion wall 36. The hose tubes 300 may span the joining region 31 between the barrel portion 26 and the hopper portion 28 of the tank trailer 20 in order to improve strength.

The hose tubes 300 may have sufficient length to cover or engage at least a portion of all of the hoppers 90a-e. Typically, the hose tubes 300 will extend along the side of the most forward hopper, i.e., the first hopper 90a, and extend along the side of the most rear hopper, i.e., the fifth hopper 90e. Typically, a first hose tube 300 will extend along the first side surface 70 and a second hose tube 300 will extend along the second side surface 80. In other aspects, the hose tubes 300 may have a squared, box-like, arcuate, or semi-circular shape.

Figure 8:
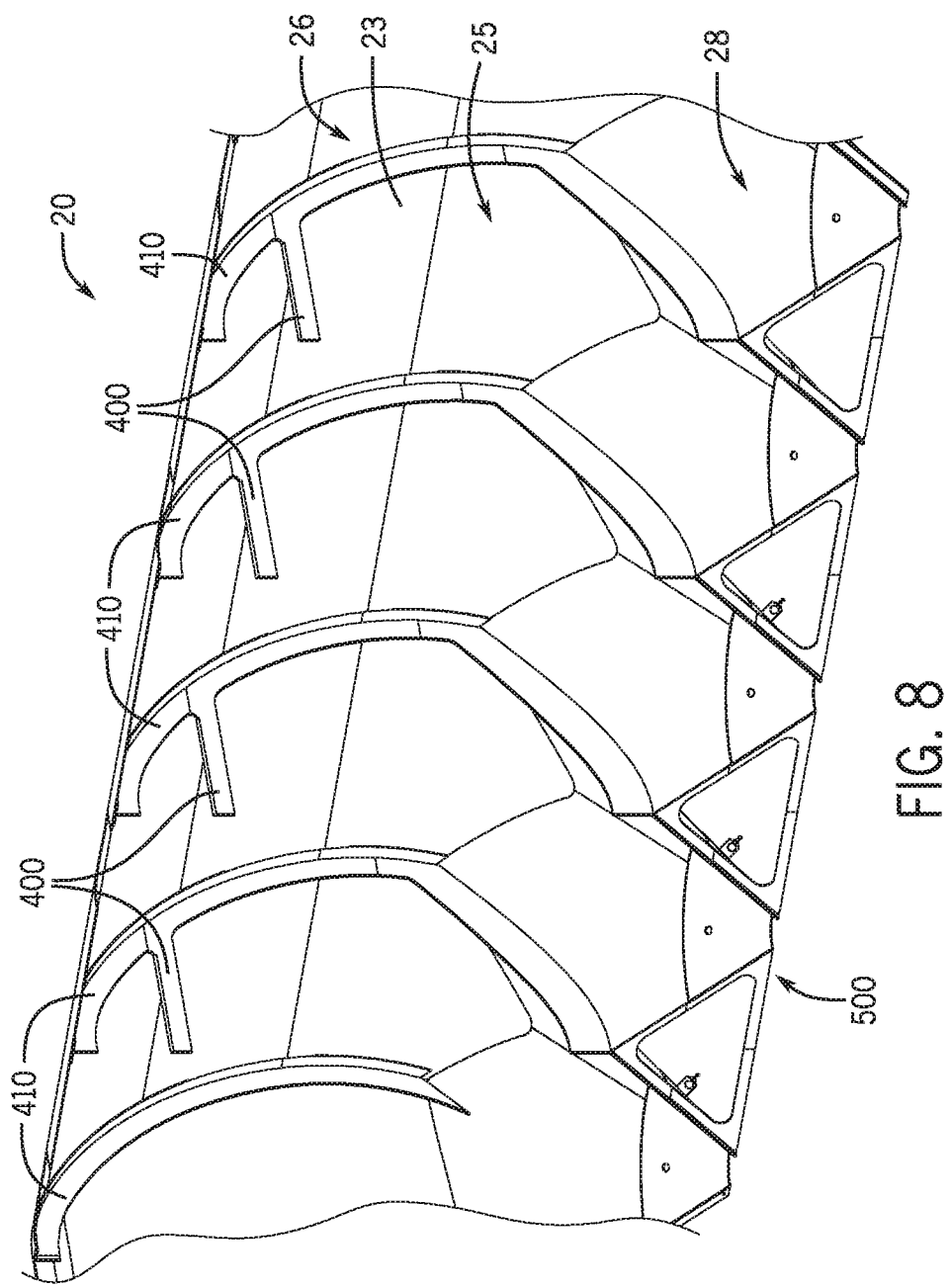
FIG. 8 is a perspective sectional view of the tank.

An improved shape for the tank 20 will now be described with reference to FIGS. 5 and 8. The barrel portion 26 of the tank 20 further includes an ovoid shape cross-section, similar to an egg-shape. The barrel portion 26 has its greatest width toward its engagement with the hopper portion 28. The barrel portion 26 is generally narrower in width closer to the top surface 30 and wider in width closer toward the joining region 31. The barrel portion 26 has a smaller radius near the top surface 30 than a radius nearer to the hopper portion 28.

The ovoid egg-shape of the tank 20 significantly reduces the amount of dead space in the tank 20. The dead space is an empty area of the tank 20 which is not filled when a material is loaded into the tank 20 from the top manhole covers 35. This design allows for high percentage first pass fill during the loading of materials into the tank 20, and the design also decreases the amount of time required to pressurize the trailer 10. The egg-shape cross-section of the tank 20 may also allow the trailer 10 to carry a larger load with a smaller cubic foot trailer (e.g., a 1700 cubic foot egg-shaped trailer may hold as much as oval 1800 cubic foot trailer 10 when each are loaded with a single pass). This also increases the aerodynamic efficiency of the trailer 10 by reducing the cross sectional area perpendicular to the area of travel without decreasing the load carrying capacity of the trailer 10.

The interior volume 25 of the tank 20 may be filled with a dry bulk material. The one or more manholes 35 are positioned in the top surface 30. The dry bulk materials are passed through the manholes 35 in order to fill the interior volume 25 of the tank 20 with the dry bulk materials. With the egg-shape of the tank 20, more efficient and even filling of the tank 20 is achieved.

The tank 20 further includes one or more internal cross-supports 400 near an approximate top one-third of the tank 20. The cross-supports 400 extend across the barrel portion 26. The cross-supports 400 help support the tank 20 against the internal pressure from pressurization and the weight of the materials. The internal cross-supports 400 help maintain the cross-sectional area of the barrel portion 26. The stress from pressurization will urge the barrel portion 26 to have a more rounded cross-section. The deflection that occurs when an egg-shaped trailer tries to become round may cause significant stress. However, the cross-supports 400 placed between the internal ribs 410 significantly decrease the stress in the egg-shaped tank 20.

The one or more internal cross-supports 400 are positioned in the barrel portion 26 of the tank 20. The tank 20 further includes internal ribs 410 that engage an inner surface 23 of the tank 20. The internal ribs 410 have a generally vertical orientation, and line the inner surface 23 of the tank 20. The cross-supports 400 extend in a direction generally perpendicular to the direction of travel of the tank trailer 10. The cross-supports 400 are engaged to the internal ribs 410, and the cross-supports 400 extend the entire span between the internal ribs 410, i.e., the width of the tank 20. The cross-supports 400 may pass through the interior 25 of the tank 20. The cross supports 400 are manufactured to have no or very little upward facing surfaces so that materials will not be caught on the cross supports 400. The cross supports 400 are also connected to the internal ribs 410 with a large radius to facilitate cleaning of the tank 20.

Figure 9:
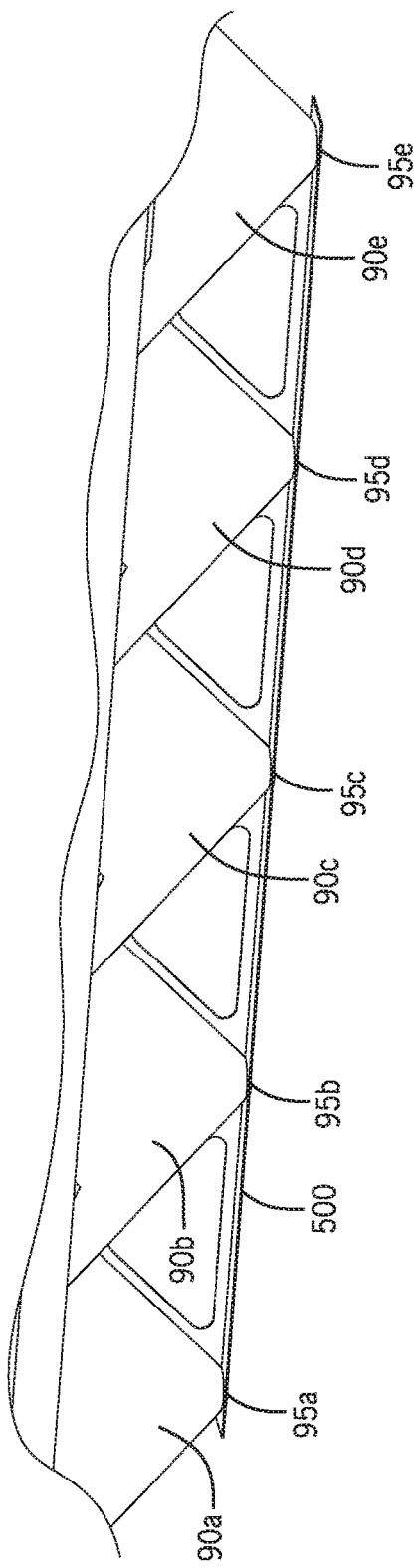
FIG. 9 is a perspective view of the bottom rail.

An improved frameless design for the trailer 10 will now be described with reference to FIGS. 9 and 10. The tank 20 further includes a bottom rail 500. By eliminating the typical side frames used in many conventional tank trailers, the weight of the trailer 20 is reduced and fuel efficiency is improved. The bottom rail 500 is mounted to the tank 20. The bottom rail 500 also limits the deflection of the hoppers 90*a-e* and helps to maintain the stresses at an acceptable level. The bottom rail 500 also makes it easier to manufacture the trailer 20 right side up.

Figure 10:
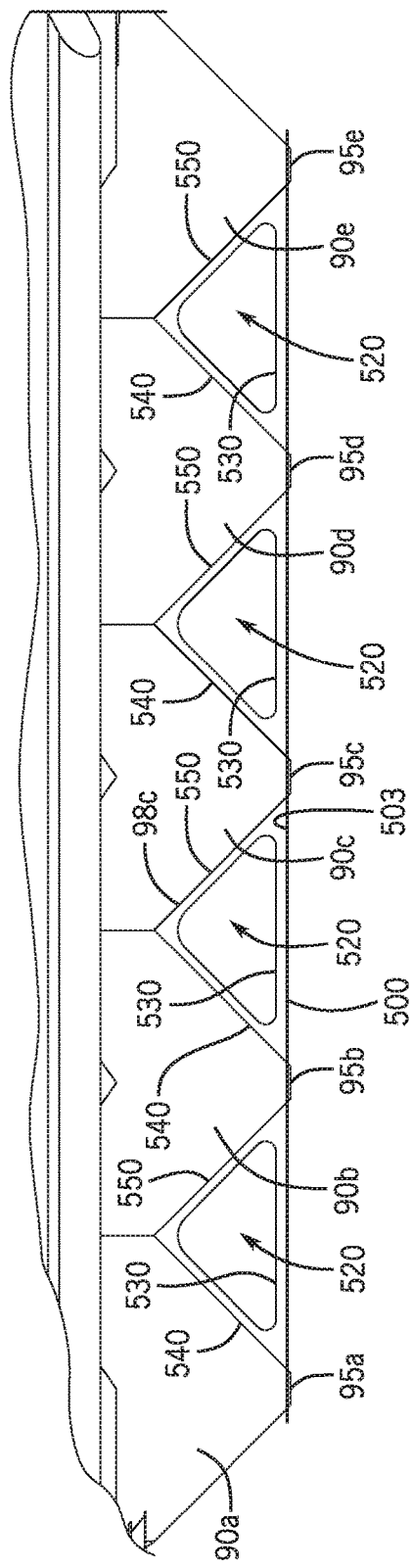
FIG. 10 is a side view of the hoppers and the bottom rail.

With reference to FIG. 10, the bottom rail 500 extends along the bottom of the hoppers 90*a-e* from the most forward hopper 90*a* to the most rear hopper 90*e*. The bottom rail 500 lies along a central axis for the trailer 10. The tank 20 may include a single bottom rail 500 as its frame. The tank 20 does not require additional frame members positioned along the bottom surface 40.

The bottom rail 500 is integrated with one or more triangular supports 520. The triangular supports 520 generally include three surfaces. A bottom surface 530 of the triangular support 520 engages a top surface 503 of the bottom rail 500. A front surface 540 of the triangular support 520 engages the exterior surface of one of the hoppers 90*a-e*, while a rear surface 550 of the triangular support 520 engages the exterior surface of an adjacent hopper 90*a-e*. Generally, a triangular support 520 is positioned between each hopper 90*a-e*. For example, the pneumatic tank trailer 10 includes five hoppers 90*a-e*, and thus four triangular supports 520 are used in order to position a triangular support 520 between each of the hoppers 90*a-e*.

The bottom rail 500 includes one or more openings 505 positioned to receive the openings 95*a-e* of the hoppers 90*a-e*. The hoppers 90*a-e* may pass through the openings 505 in the bottom rail 500, seal the openings 95*a-e* against the openings 505 in the bottom rail 500, or seat in the lower openings 505 of the bottom rail 500.

The tank trailer 10 further includes a modular design. The interior 25 of the tank 20 may have a volume of approximately 700 cubic feet of storage to approximately 2500 cubic feet of storage, depending upon the size of the hoppers 90*a-e* and the number of hoppers 90*a-e* utilized. The individual hoppers 90*a-e* may all have a substantially similar or an identical design. The capacity of the pneumatic tank trailer 10 may be increased by adding additional hoppers 90. The same components, i.e., the hoppers 90, front end cones 201, rear end cones 221, and front end covers 211, may be used with trailers 20 of different lengths. The only difference between the trailers 20 would be the number of hoppers 90 and the length of the barrel portion 26. A pneumatic tank trailer 20 with two hoppers 90*a-b* may provide approximately 700 cubic feet of storage. A pneumatic tank trailer 20 with three hoppers 90*a-c* may provide approximately 1000 cubic feet of storage. A pneumatic tank trailer 20 with four hoppers 90*a-d* may provide approximately 1350 cubic feet of storage. A pneumatic tank trailer 20 with five hoppers 90*a-e* may provide approximately 1800 cubic feet of storage. The pneumatic tank trailer 10 creates a whole family of pneumatic trailers simply by adding hoppers 90 and increasing the length of the barrel portion 26.

The hoppers 90*a-e* are fluidly connected to a discharge line 260 that extends the approximate length of the pneumatic tank trailer 10. The discharge line 260 includes a discharge opening 262 which provides for discharge of the bulk material from the tank 20. The respective openings 95*a-e* of the hoppers 90*a-e* join the discharge line 260 in order to pass the dry bulk material to the discharge line 260. Each of the hoppers 90*a-e* may include a valve for controlling discharge through their respective openings 95*a-e*. The hoppers 90*a-e* may further include aeration systems (not shown) that assist in emptying the tank 20 of the dry bulk material. Such aeration systems are well known to those skilled in the art. During travel, the dry bulk material in the tank 20 may compact, under its weight, in the lower portions of the hoppers 90*a-e* and the aeration system helps promote flow of the material from the hoppers 90*a-e*.

The hoppers 90*a-e*, the front end cone 201, and the rear end cone 221 and the barrel portion 26 may be formed from metals and metal alloy materials, such as aluminum, having a thickness of approximately ⅛ inch to ⅜ inch, although the thickness of the material may vary throughout the construction of the tank 20.

It is another aspect of the present invention to provide a trailer 10 with a lower center of gravity. This increases the stability of the trailer 10 as it is pulled around a corner. It is a further aspect of this invention to provide a trailer 10 that is as short in length as possible while still complying with federal bridge laws. These laws are well known to those skilled in the art. A shorter trailer 10 will be easier to maneuver and will fit into tighter quarters, which may be necessary for the loading and unloading of the tank 20. In order to accomplish these aspects, the trailer 10, in certain aspects, may be made approximately 102 inches wide. The hoppers 90*a-e* are also more numerous and closer together than on a conventional pneumatic trailer. This increases the amount of material that can be held lower, and thus the center of gravity is lower. These same modifications have also allowed the trailer 10 to be built having a wheel base as short as possible while still complying with federal bridge laws.

Figure 11:
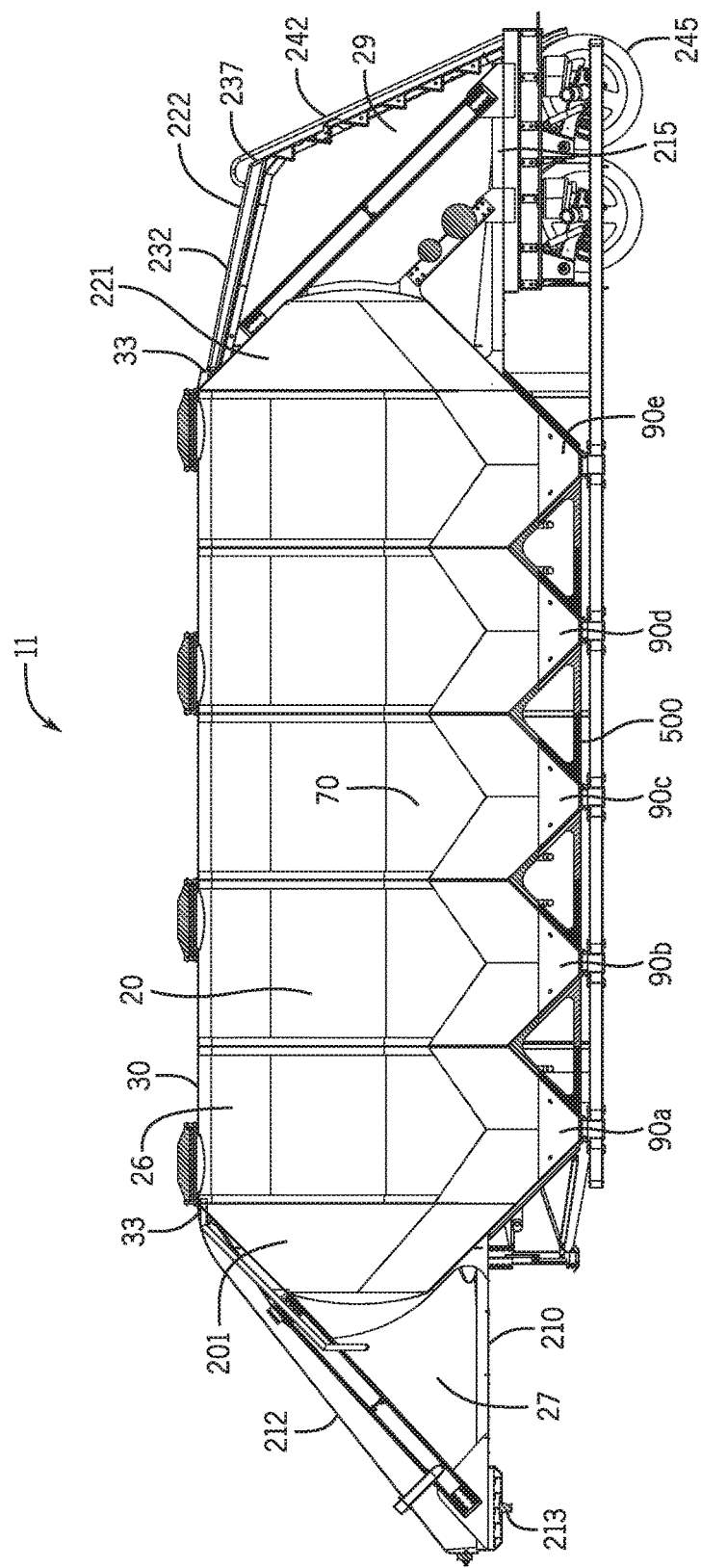
FIG. 11 is a side view of the second trailer.
Figure 12:
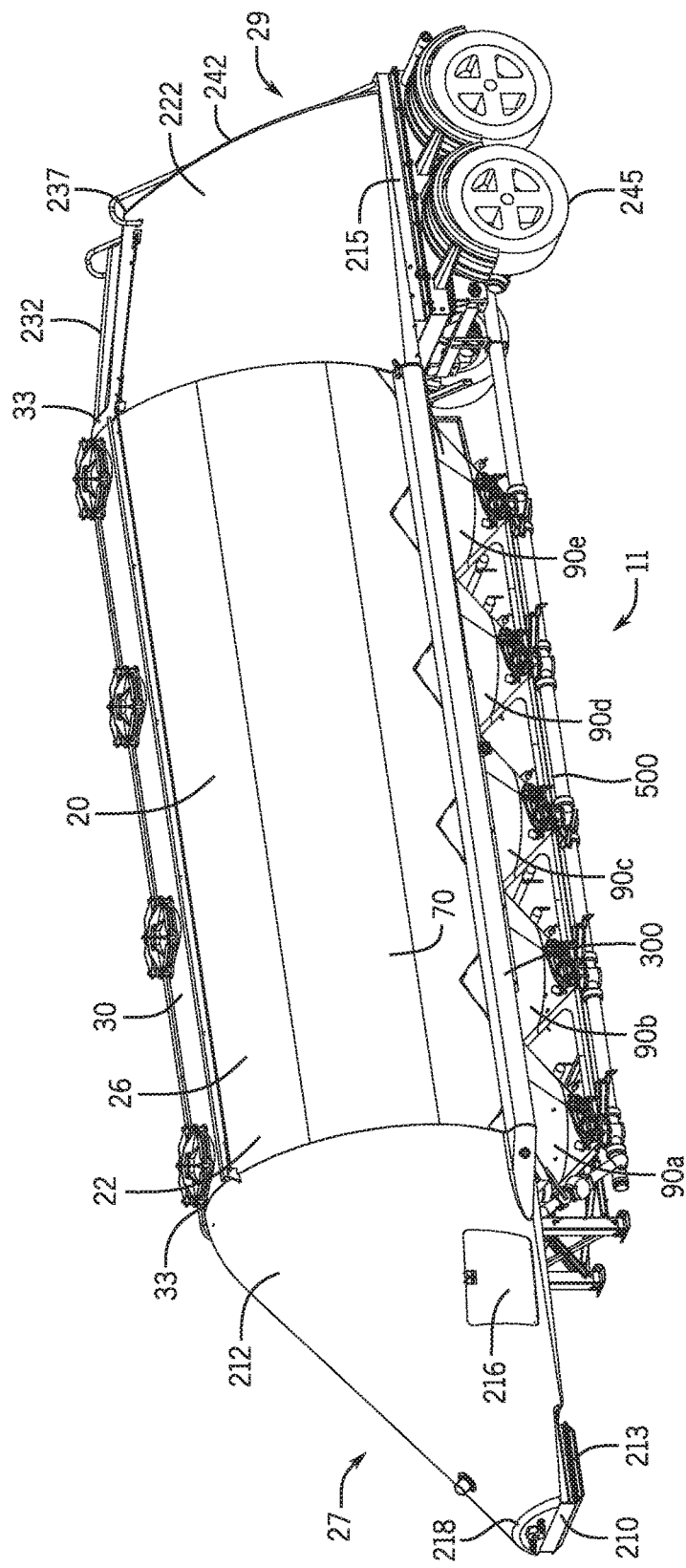
FIG. 12 is a perspective view of the second trailer.
Figure 13:
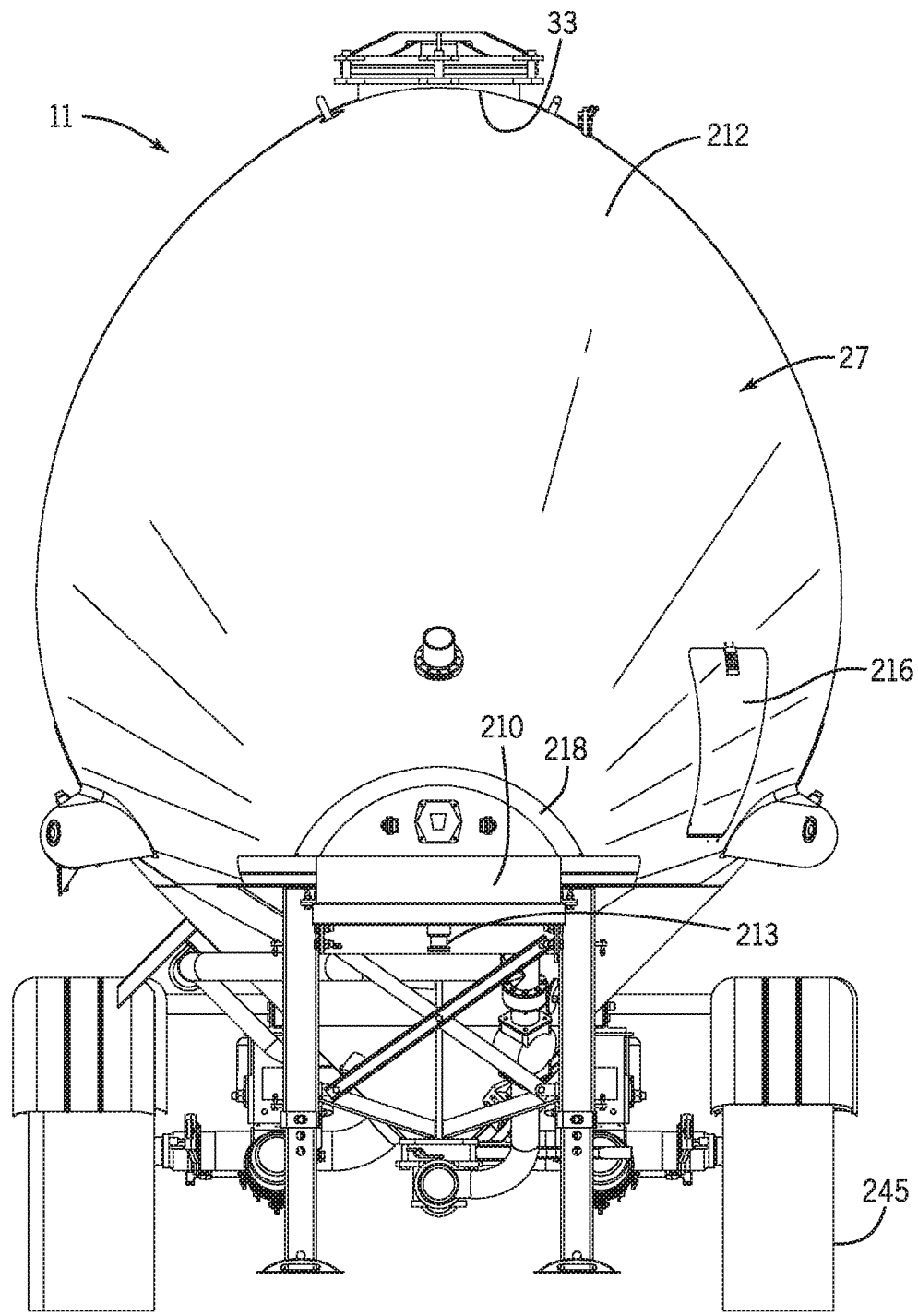
FIG. 13 is a front view of the second trailer.
Figure 14:
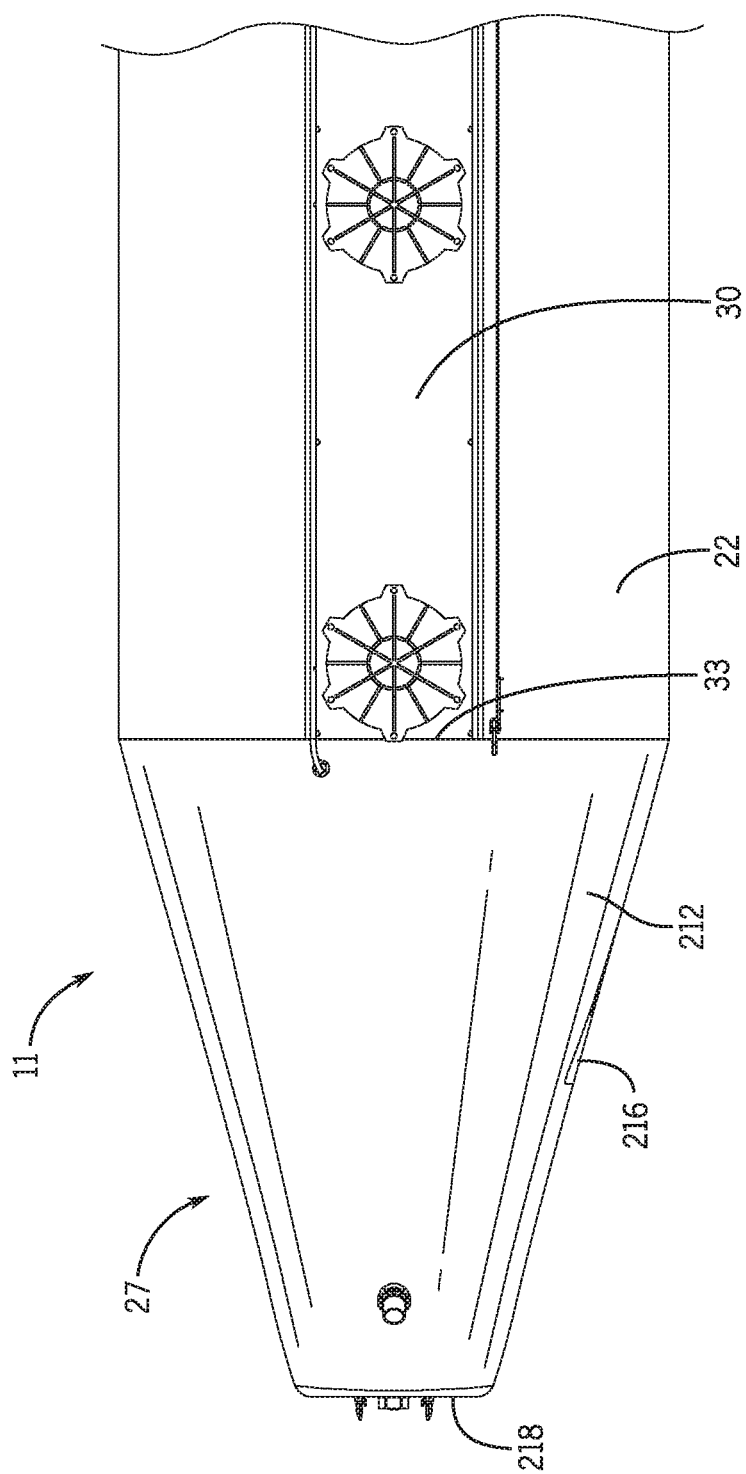
FIG. 14 is atop down view of the front section of the second trailer.

In another aspect, a trailer 11 is shown in FIGS. 11 and 12. The trailer 11 is generally the same or similar to trailer 10 in construction, except for a front end cover 212 and a rear end cover 222. Other like or similar components or structures between the trailer 10 and the trailer 11 are numbered the same in FIGS. 11 and 12. The trailer 11 includes the front end cover 212 that slopes down at an angle of approximately 10 degrees to approximately 55 degrees. The front end cover 212 substantially covers the front end cone 201 of the tank 20. The front end cover 212 extends from the top surface 30 of the barrel portion 26 and encloses the front end portion 27 of the trailer 11. The front end cover 212 extends from the top surface 30 of the barrel portion 26 to the front deck 210 of the trailer 11. The front end cover 212 may extend from the top surface 30 of the barrel portion 26 to a leading surface 218 of the front end cover 212 at an angle of approximately 10 degrees to approximately 55 degrees. The front end cover 212 provides an aerodynamic leading surface for the trailer 11 that covers the front end cone 201. Sides of the front end cover 212 also angle or taper inwards toward the leading surface 218 of the front end cover 212. The sides of the front end cover 212 may angle or taper inwards at an angle of approximately 10 degrees to approximately 25 degrees.

In the aspect shown in FIGS. 11 and 12, the front end cover 212 slopes down from the top surface 30 at an angle of approximately 45 degrees. At this angle, the front end cover 212 covers the front end cone 201, which may be formed with steeper sides to more closely match the angle of repose of the material filled into the tank 20. The front end cover 212 generally encloses the front end portion 27 of the trailer 11. The front end cover 212 slopes from the barrel portion 26 to a kingpin 213 and/or the front deck 210 of the trailer 11.

The front end cover 212 blends into the outer surface 22 of the tank 20 at a seam 33. The top surface 30 has a generally zero slope leading into the seam 33, and the front end cover 212 slopes down from the seam 33 at an angle of approximately 45 degrees.

The front end cover 212 includes an access 216, such as a hatch, door, or other removable cover that provides access to the plumbing and support structure of the trailer 11. The front end cover 212 is not an integral portion of the trailer 20, i.e., the trailer 20 may be filled and towed without the front end cover 212. The front end cover 212 may be made from aluminum, fiberglass or other suitable materials.

The trailer 11 also includes the rear end cover 222 that slopes generally down from the top surface 30 of the barrel portion 26 at an angle of approximately 5-15 degrees and in from the sides 70 and 80 of the barrel portion 26 at an angle of approximately 5-15 degrees. The rear end cover 222 substantially covers the rear end cone 221. The rear end cover 222 may extend from the top surface 30 to the rear deck 215. The rear end cover 222 may cover the entire distance between the top surface 30 and the rear deck 215. The rear end cover 222 may blend into the top surface 30 at a seam 33. The top surface 30 has a generally zero slope leading into the seam 33. At the seam 33, the rear end cover 222 slopes downward at the angle of approximately 5-15 degrees.

The rear end cover 222 includes a front portion 232 and a rear portion 242. The front portion 232 may slope downward at an angle of approximately 5-15 degrees. At the rear portion 242 of the rear end cover 222, the slope increases to approximately 45 degrees to 65 degrees or more in the downward direction. A transition point 237 may separate the front portion 232 from the rear portion 242. At the transition point 237, the slope of the rear end cover 222 increases from 5-15 degrees to approximately 45 degrees to 65 degrees. The rear end cover 222 could be formed with steps or a ladder that allows access to the top surface 30 of the trailer 11.

The rear end cover 222 may be made of aluminum, fiberglass, or other suitable materials. The rear end cover 222 includes an access, such as a hatch, door, or other removable cover that provides access to tanks, hoses, etc. stored in the rear end portion 29 of the trailer 11.

Figure 15:
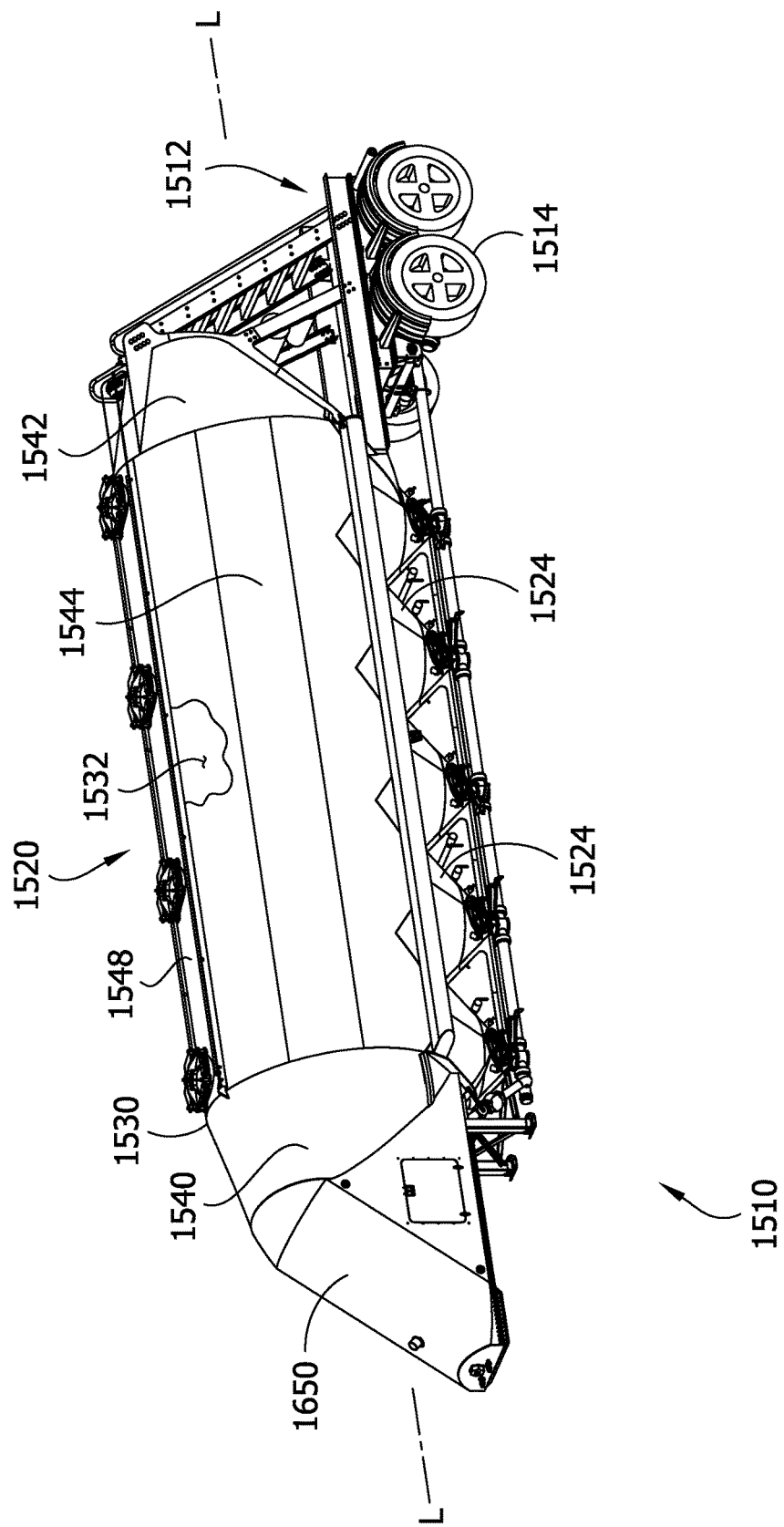
FIG. 15 is a perspective of another embodiment of a pneumatic tank trailer.
Figure 16:
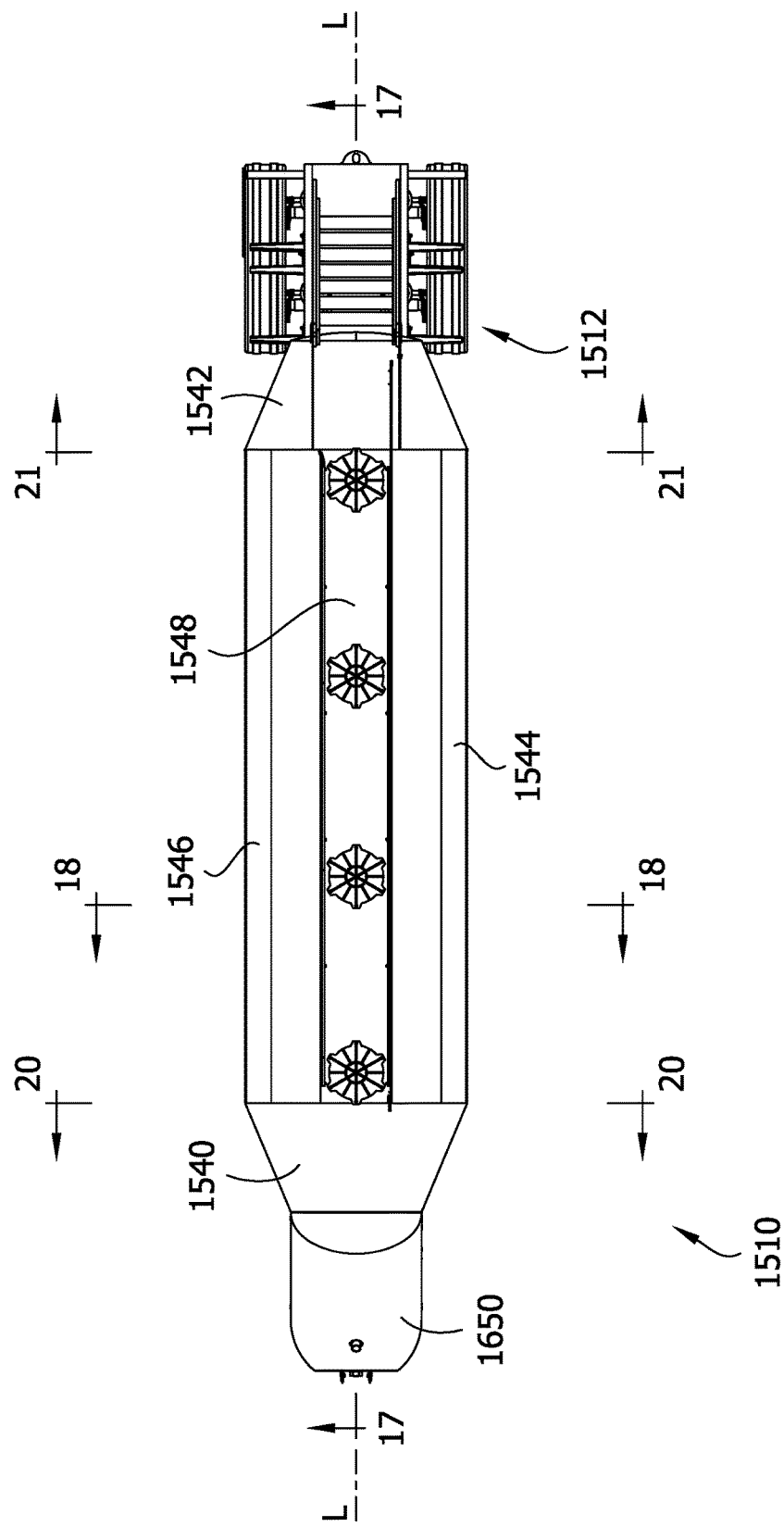
FIG. 16 is atop plan view of the trailer of FIG. 15.

Referring to FIGS. 15 and 16, another embodiment of a pneumatic tank trailer is generally indicated at reference number 1510. The trailer 1510 is similar in many respects to the trailers discussed above. The trailer 1510 includes a carriage 1512 that mounts trailer wheels 1514 for rolling along an underlying surface. The carriage 1512 supports and mounts a tank 1520, which extends along a longitudinal axis L of the trailer 1510 from a front end to a rear end adjacent the carriage. The tank 1520 includes a plurality of hoppers 1524 that define a bottom end portion of the tank and a tank wall 1530 that extends up from the hoppers 1524 and defines an interior 1532 of the tank. The tank 1520 is configured to receive fluidizable material in the interior 1532 and to selectively discharge the material through the hoppers 1524. Moreover, the interior 1532 of the tank 1520 is configured to be pressurized to cause material to more easily and completely flow out of the hoppers 1524.

As will be appreciated, lightweight framing reinforces the tank 1520 to withstand large internal pressures without adversely affecting the fuel efficiency of the trailer 1510. As will be discussed in further detail below, the weight and cost of the framing is minimized by using relatively high strength reinforcement at locations of the tank 1520 where internal fluid pressure causes significant stress and using less reinforcement at lower stress locations. The illustrated design also minimizes the amount of framing that extends externally of the tank wall 1530 to minimize the drag coefficient of the trailer 1510.

Figure 17:
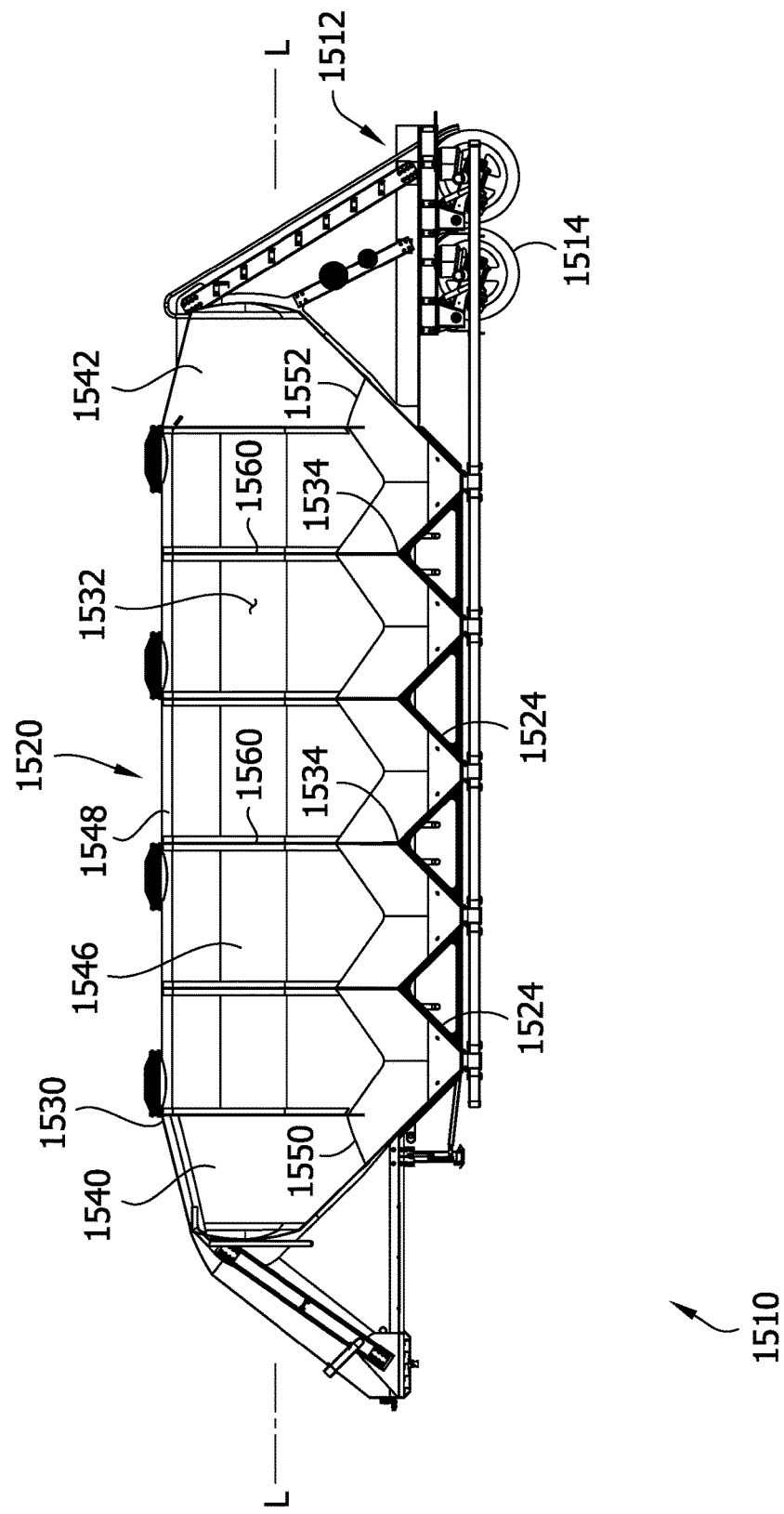
FIG. 17 is a section taken in the plane of line 17-17 of FIG. 16.

In the illustrated embodiment, the tank 1520 includes five hoppers 1524 spaced apart along the longitudinal axis L of the tank. Other embodiments can use other numbers and arrangements of hoppers without departing from the scope of the invention. Referring to FIG. 17, each of the hoppers 1524 has a top end portion and a bottom end portion. The top end portions of adjacent hoppers are arranged next to each other and define hopper joint areas 1534, and the bottom end portions of adjacent hoppers are spaced apart along the longitudinal axis L of the tank 1520. The hopper joint areas 1534 join together adjacent hoppers 1524 and define a peak so that material received in the interior 1532 of the tank 1520 at the hopper joint areas generally falls to either side of the hopper joint area and into one of the respective hoppers.

Figure 18:
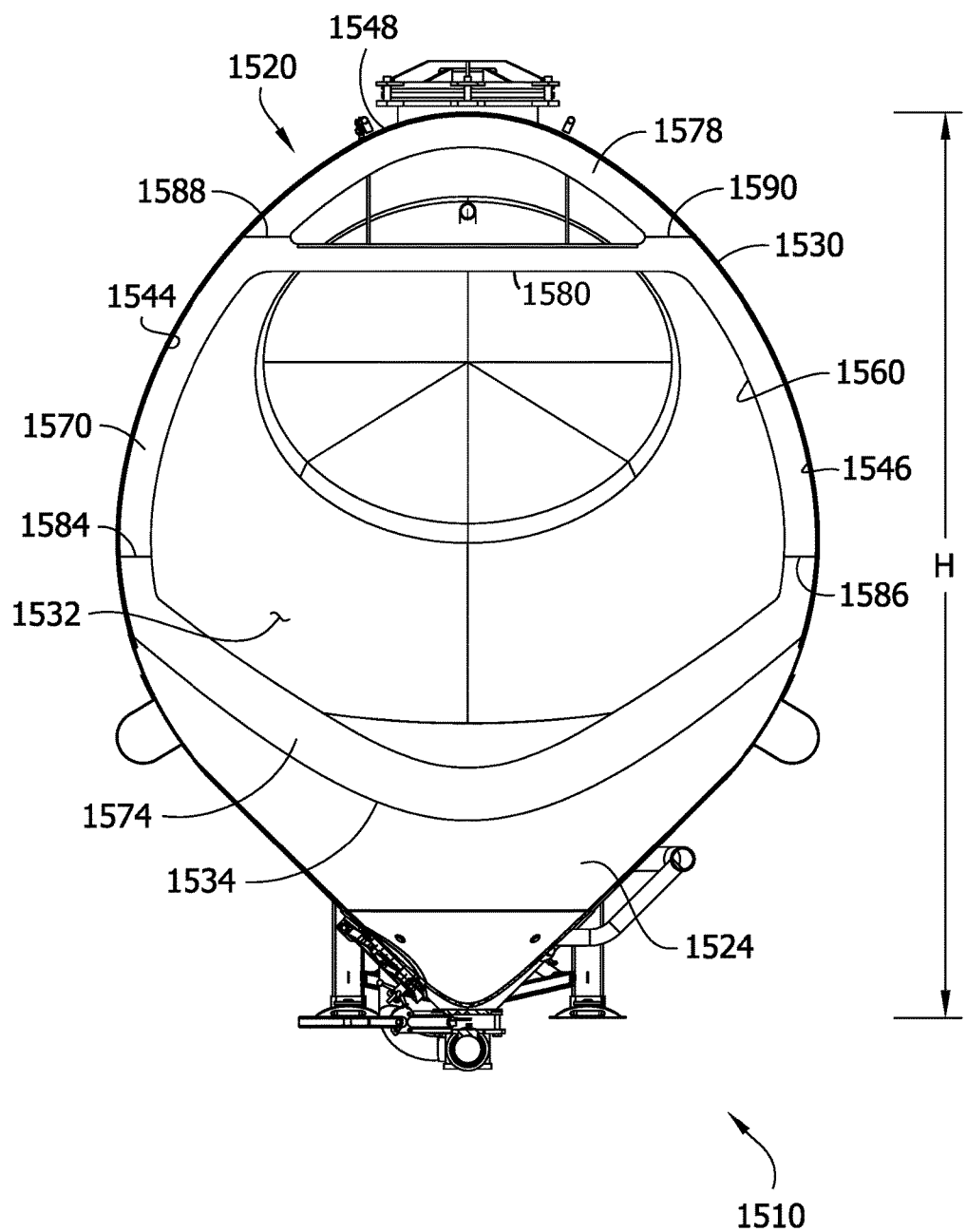
FIG. 18 is a section taken in the plane of line 18-18 of FIG. 16.

Each hopper joint area 1534 has the same general shape. Referring to FIG. 18, in the illustrated embodiment each hopper joint area 1534 has a curved shape. The hopper joint areas 1534 extend from a first high point adjacent one side of the tank 1520, to a low point about midway between the opposite sides of the tank, to another high point adjacent the opposite side of the tank.

Referring again to FIGS. 15 and 16, the tank wall 1530 extends along the longitudinal axis L of the tank 1520 from a front wall portion 1540 to a rear wall portion 1542. The tank wall 1530 also includes opposite first and second side wall portions 1544, 1546 and a top wall portion 1548. Together, the first and second side wall portions 1544, 1546 and the top wall portion 1548 extend along the longitudinal axis L from the front wall portion 1540 to the rear wall portion 1542. As shown in FIG. 17, the front wall portion 1540 is joined to the top end portion of the front hopper 1524 at a front joint area 1550. The rear wall portion 1542 is, likewise, joined to the top end portion of the rear-most hopper 1524 at a rear joint area 1552. The top wall portion 1548 extends generally laterally between the first and second side wall portions 1544, 1546 and defines the top of the tank 1520. The side wall portions 1544, 1546 have bottom edge portions that are joined to the top end portions of the hoppers 1524 to fully enclose the tank 1520. As shown in FIG. 18, the top wall portion 1548 is spaced apart from the bottom ends of the hoppers 1524 by a height H.

Figure 19:
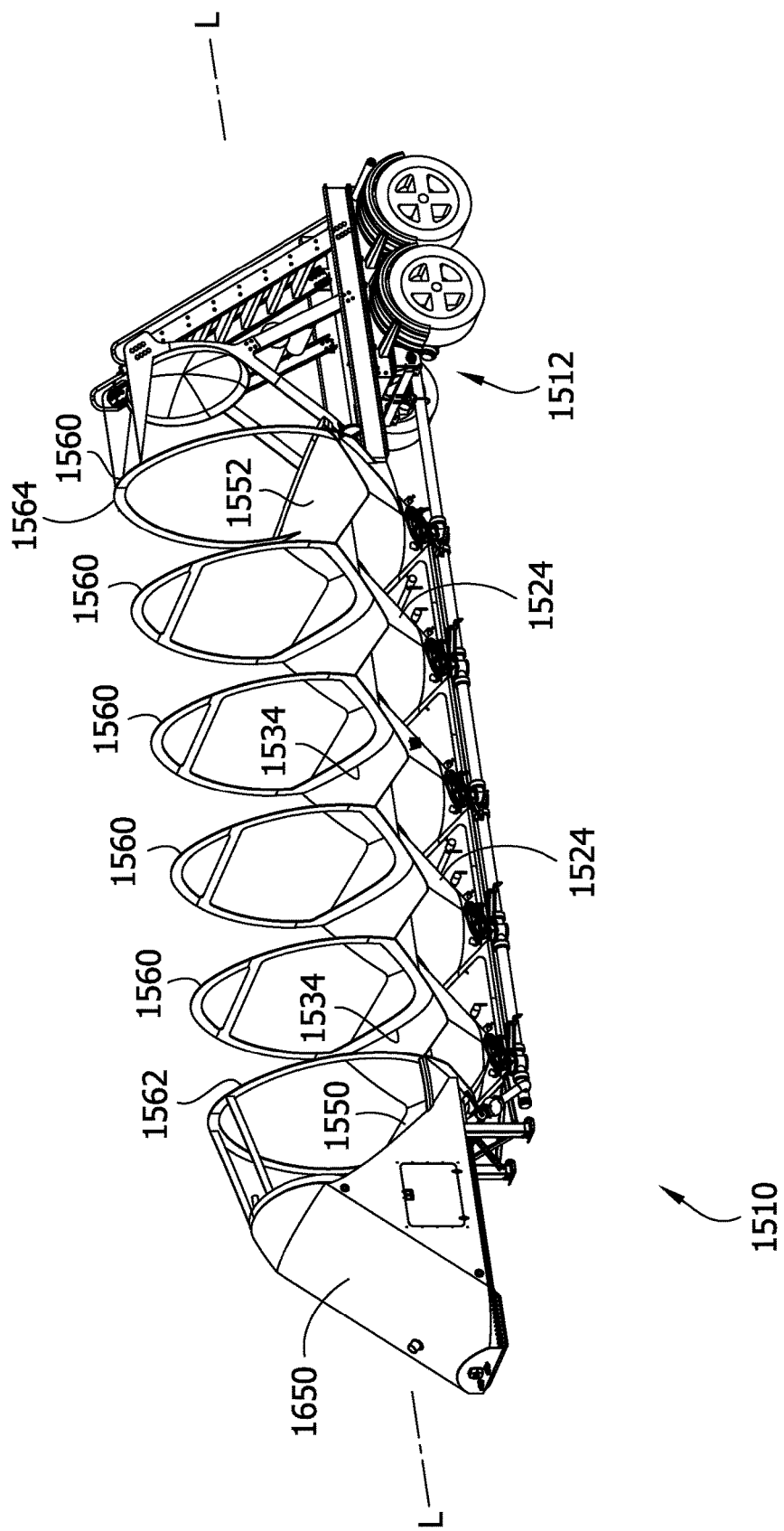
FIG. 19 is a perspective of the trailer with a tank wall removed to reveal internal components.

Referring to FIG. 19, the illustrated trailer 1510 includes a plurality of central internal frames 1560 joined to the tank 1520 in spaced apart relationship along the longitudinal axis L of the trailer 1510. The central internal frames 1560 support the tank 1520 against internal pressures therein. The central internal frames 1560 are located entirely within the interior 1532 of the tank 1520. As shown in FIG. 15, the result is a tank 1520 with a relatively smooth exterior profile, particularly along the sides and top of the tank. In contrast with prior art pneumatic tank trailers with external tank framing, the illustrated tank 1520 is thought to have a lower drag coefficient, which is thought to improve the fuel efficiency of the trailer 1510.

Each of the internal frames 1560 is longitudinally aligned with a respective hopper joint area 1534 (FIG. 17) and extends circumferentially around the tank interior 1532 (FIG. 18). As shown in FIG. 19, each of the internal frames 1560 is a metal plate extending in a plane transverse to the longitudinal axis L of the tank 1520. The use of a plate instead of another type of structural member is thought to reduce the total weight of each internal frame 1560. In the illustrated embodiment, the central internal frames 1560 are substantially identical. But in other embodiments the central internal frames can have different shapes and arrangements without departing from the scope of the invention.

In addition to the central internal frames 1560, the illustrated tank includes front and rear internal frames 1562, 1564 that are longitudinally aligned with the respective front joint area 1550 and rear joint area 1552. Like the central internal frames 1560, the front and rear internal frames 1562, 1564 are formed from metal plates extending in respective planes oriented transverse to the longitudinal axis L of the tank 1520. As will be discussed in further detail below, the front and rear internal frames 1562, 1564 do not extend through the tank interior 1532 along the bottom end of the tank. Instead, other, external structure reinforces the bottom end of the tank at the front and rear joint areas 1550, 1552.

As shown in FIG. 18, each central internal frame 1560 is a multi-piece assembly comprising distinct frame members that are joined together at respective joints. In the illustrated embodiment, the internal frame 1560 comprises a central frame member, a bottom frame members 1574, and a top frame member 1578. Using a multi-piece assembly for the internal frame members 1560 greatly reduces manufacturing costs in comparison with forming the internal frame members as a single piece. But it will be understood that one-piece frames can also be used without departing from the scope of the invention.

In general, the central frame member 1570, bottom frame member 1574, and top frame member 1578 are joined together to define a frame 1560 that extends circumferentially around the tank interior 1532 in substantially continuous contact with the tank wall 1530 and hopper joint area 1534. The central frame member 1570 forms a side portion of the central internal frame 1560 extending along the first side wall portion 1544 of the tank wall 1530 and another side portion of the central internal frame that extends along the second side wall portion 1546. The central frame member 1570 is preferably joined to the first and second side wall portions 1544, 1546, respectively, such as by welding. The bottom frame member 1574 forms a bottom portion of the central internal frame 1560 that extends along the respective hopper joint area 1534. The top frame member 1578 similarly forms a top portion of the central internal frame 1560 that extends along the top wall portion 1548. Like the central frame member 1570, the bottom and top frame members 1574, 1578 are preferably joined to the respective segments of the tank 1520, for example by welding.

Along with being joined to the tank 1520, the illustrated frame members 1570, 1574, 1578 are joined to one another by welding. In other embodiments, frame members can be joined together in other ways without departing from the scope of the invention. One skilled in the art will appreciate that, when two pieces are joined together at a welded joint, the resulting assembly is generally weakest near the location of the weld. To ensure the central internal frame assembly 1560 withstands the forces imparted upon the tank 1520 by internal pressures, the frame members 1570, 1574, 1578 are joined together at joint locations where the tank experiences lower stress when under internal pressure.

Several exemplary joint locations will now be briefly described. The bottom frame member 1574 is joined to the lower end of one side of the central frame member 1570 at a first lower side joint 1584. The first lower side joint 1584 is spaced apart above the high point of the of the hopper joint area 1534 near the first side wall portion 1544. The bottom frame member 1574 is also joined to the central frame member 1570 at a second lower side joint 1586. The second lower side joint 1586 is located spaced apart above the high point of the hopper joint area 1534 near the second side wall portion 1546. The central frame member 1570 is joined to the top frame member 1578 at a first upper side joints 1588 located adjacent the intersection between the top wall portion 1548 and the first side wall portions 1544 and a second upper side joint 1590 located adjacent the intersection between the top wall portion 1548 and the second side wall portion 1546. The locations of the joints 1584, 1586, 1588, 1590 at the lower corners and upper corners of the tank 1520 are thought to align with locations around the circumference of the tank 1520 that experience relatively less stress when the tank 1520 is pressurized to facilitate unloading of fluidizable product.

Besides locating the joints at low stress locations around the tank 1520, the illustrated central internal frame member is also shaped and arranged to provide greater reinforcement to high stress tank locations. In the illustrated embodiment, the width of the internal frame member 1560 varies as it extends circumferentially around the tank interior 1532. At the bottom portion of the central internal frame 1560, where internal pressure is thought to exert a relatively high amount of stress on the tank 1520, the frame has a relatively large width. Along the top and sides of the tank 1520, where internal pressure is thought to exert a relatively low amount of stress on the tank 1520, the frame has a smaller width. By using less reinforcing material at locations of the tank 1520 that experience lower stress, the total weight of each central internal frame 1560 is reduced. In contrast with heavier framing, the lightweight central internal frames 1560 are thought to improve the fuel efficiency of the trailer 1510.

In addition to extending circumferentially around the tank interior 1532, the central internal frame 1560 also includes a cross joist portion 1580. The cross joist portion 1580 extends laterally between the side wall portions 1544, 1546 of the tank wall 1530 at a location spaced apart between a bottom and top portions of the internal frame 1560. Preferably, the cross joist portion 1580 of the central internal frame 1560 is vertically spaced apart from the bottom end portion of the hoppers 1524 by at least two-thirds of the tank height H. For example, the cross joist portion 1580 can be spaced apart above the lower side joints 1584, 1586 such that the lower side joints are spaced apart between the cross joist portion and the high points of the respective hopper joint area 1534. In the illustrated embodiment, the central frame member 1570 has an inverted U-shape and forms the cross joist portion 1580. But in other embodiments, it is contemplated that, for example, the top frame member could define the cross joist portion without departing from the scope of the invention.

While the central internal frames 1560 are shaped to define the cross joist portion 1580 and extend circumferentially around the tank interior 1532, the front and rear internal frames 1562, 1564 are shaped differently to accommodate material located in the front and rear end portions of the tank interior 1532. Because the central internal frames 1560 are aligned with hopper joint areas 1534, the first and second lower frame members 1574, 1576 do not block material from flowing freely into the hoppers 1524. The material can flow to one side or the other of each central internal frame 1560 into a respective hopper 1524. The front and rear internal frames 1562, 1564 are, however, located at the front and rear hopper joint areas 1550, 1552, respectively. If a frame member were to extend in the bottom of the tank interior 1532 along the front hopper joint area 1550, it would block material located forward of the joint area from flowing into the front hopper 1524. Likewise, if a frame member were to extend in the bottom of the tank interior 1532 along the rear hopper joint area 1552, it would block material located rearward of the rear joint area from flowing into the rear hopper 1524.

Figure 20:
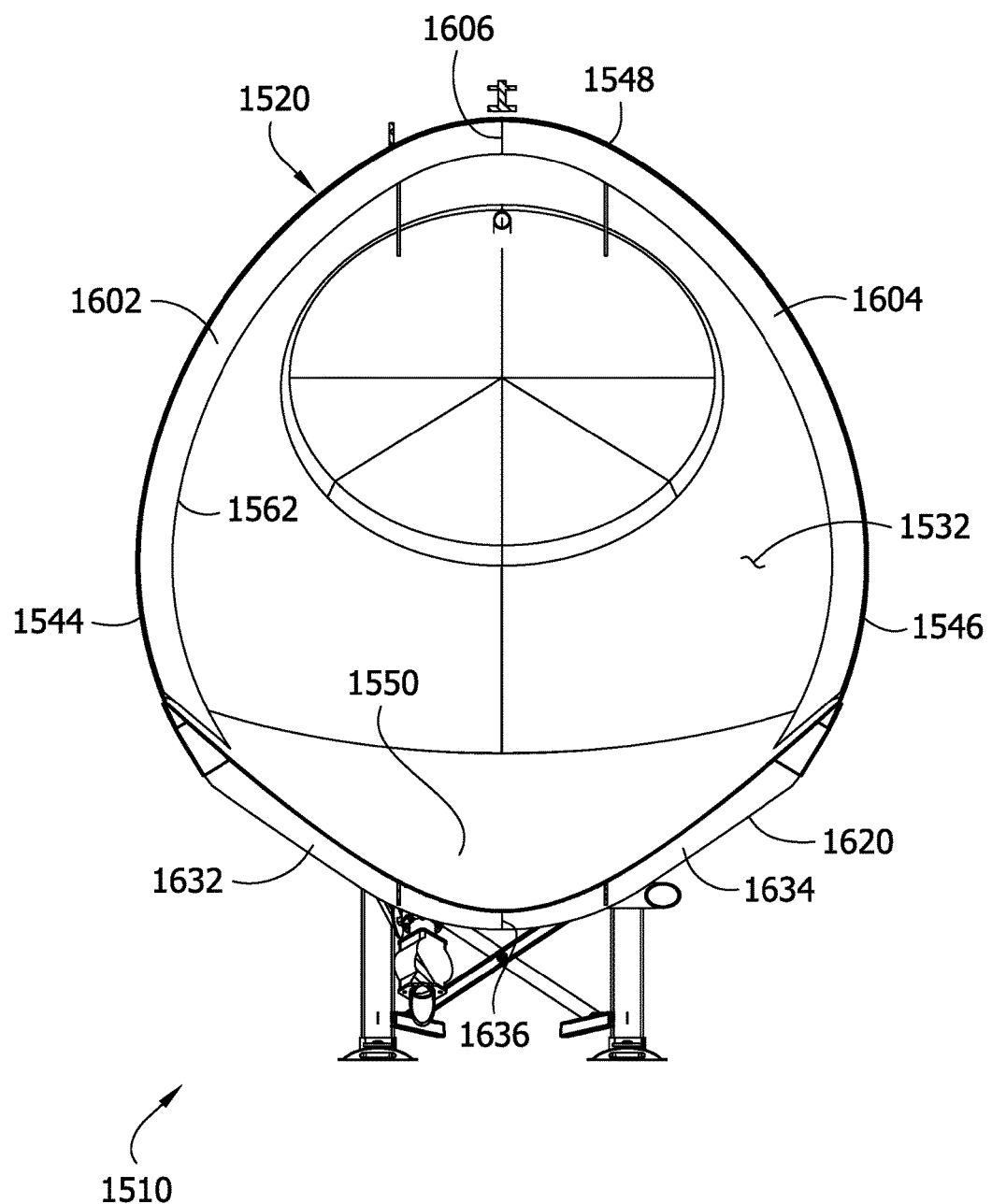
FIG. 20 is a section taken in the plane of line 20-20 of FIG. 16.
Figure 21:
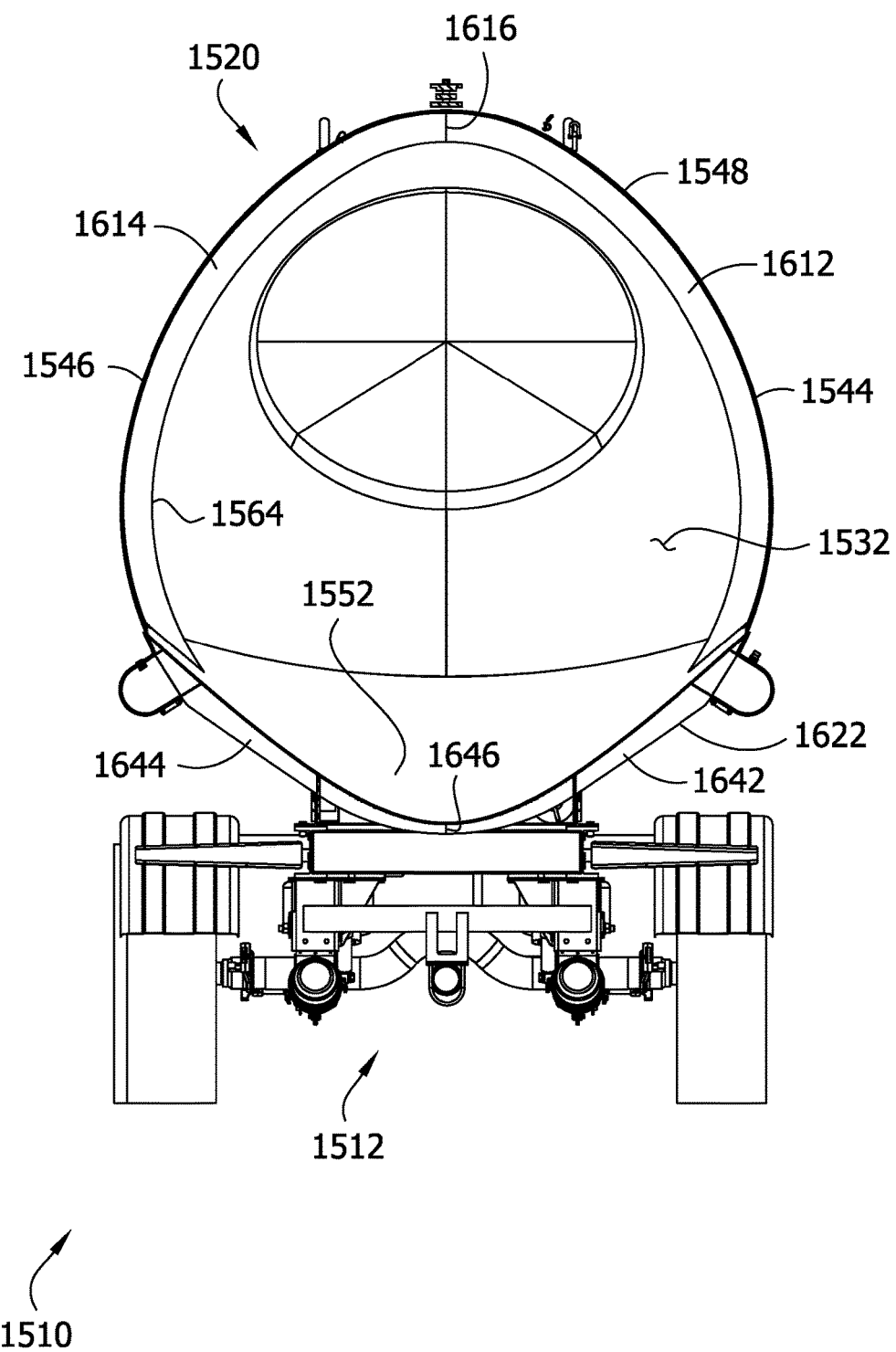
FIG. 21 is a section taken in the plane of line 21-21 of FIG. 16.

To permit free flow of material into the hoppers from substantially any location within the tank interior 1532, the front and rear internal frames 1562, 1564 are arch-shaped, lacking a bottom end portion that extends through the tank interior along the bottom end of the tank 1520. As shown in FIG. 20, the front internal frame 1562 is joined to the tank 1520 (e.g., by welding) and extends inside the tank along the first side wall portion 1544, top wall portion 1548, and second side wall portion 1546. As shown in FIG. 21, the rear internal frame 1564 is joined to the tank 1520 (e.g., by welding) and extends inside the tank along the first side wall portion 1544, top wall portion 1548, and second side wall portion 1546. The front and rear internal frames 1562, 1564 do not, however, extend along the bottom interior surface of the tank at the front and rear hopper joint areas 1550, 1552. Instead, as shown in FIG. 19, the bottom interior surface of the tank 1520 adjacent the front and rear hopper joint areas 1550, 1552 slopes substantially unobstructed from the front and rear ends of the tank to the bottom ends of the front and rear hoppers 1524.

In the illustrated embodiment, the front and rear internal frames 1562, 1564 are multi-piece assemblies. As shown in FIG. 20, the front internal frame 1562 includes a first frame member 1602 that extends along the first side wall portion 1544 and a segment of the top wall portion 1548 and a second frame member 1604 that extends along the second wall portion 1546 and another segment of the top wall portion of the tank. The first and second front internal frame members 1602, 1604 are joined to the tank 1520 and to one another at a joint 1606 (e.g., by welding) to form the front internal frame 1562. The joint 1606 is located at the top of the tank 1520, midway between the side wall portions 1544, 1546, where relatively low stress is thought to be imparted on the tank by internal pressure. As shown in FIG. 21, the rear internal frame 1564 includes a first frame member 1612 that extends along the first side wall portion 1544 and a segment of the top wall portion 1548. A second frame member 1614 extends along the second wall portion 1546 and another segment of the top wall portion 1548. The first and second rear internal frame members 1612, 1614 are joined to the tank 1520 and to one another at a joint 1616 (e.g., by welding) to form the rear internal frame 1564. The joint 1616 is located at the top of the tank 1520, midway between the side wall portions 1544, 1548, where relatively low stress is thought to be imparted on the tank by internal pressure.

Although, to avoid obstructing material flow into the hoppers 1524, the front and rear internal frames 1562, 1564 do not extend along the front and rear hopper joint areas 1550, 1552, it is preferable to still provide other reinforcement of the bottom side of the tank 1520. Referring to FIGS. 20 and 21, the illustrated trailer 1510 includes front and rear external frames 1620, 1622 that reinforce the tank 1520 at the front and rear hopper joint areas 1550, 1552. The front external frame 1620 is aligned with the front internal frame 1562 along the longitudinal axis L of the trailer 1510. In the illustrated embodiment, the front external frame 1620 is a metal plate extending substantially in the same plane as the front internal frame 1562. In the illustrated embodiment, the front external frame 1620 is connected to the front internal frame 1562 by the wall of the tank 1520 at the front joint area 1550. Together the internal and external frames 1562, 1620 form a front frame that extends circumferentially around the tank interior 1532 at the front hopper joint area 1550. The rear external frame 1622 is, likewise, aligned with the rear internal frame 1564 along the longitudinal axis L of the trailer 1510. In the illustrated embodiment, the rear external frame 1622 is a metal plate extending in substantially the same plane as the rear internal plate 1564. The rear external frame 1622 is only connected to the rear internal frame 1564 by the wall of the tank 1520 at the rear joint area 1552. Together the internal and external frames 1564, 1622 form a rear frame that extends circumferentially around the tank interior 1532 at the rear hopper joint area 1552.

As shown in FIG. 20, the front external frame 1620 includes first and second frame members 1632, 1634 that extend downward from the front hopper joint area 1550. The first frame member 1632 extends from one end at the high point of the front hopper joint area 1550 adjacent the first side wall portion 1544 to an opposite end at the low point of the front hopper joint area. Likewise the second frame member 1634 extends from one end at the high point of the front hopper joint area 1550 adjacent the second side wall portion 1546 to an opposite end at the low point of the front hopper joint area. The ends of the frame members 1632, 1634 located at the low point of the front hopper joint area 1550 are joined together at a joint 1636 located about midway between the first and second side wall portions 1544, 1546, where stresses on the tank caused by internal pressures are thought to be low. The joint 1636 can be formed by welding the frame members 1632, 1634 together or by any other suitable method. In addition, the frame members 1632, 1634 can be joined to the tank 1520 by welding or any other suitable method.

As shown in FIG. 21, the rear external frame 1622 includes first and second frame members 1642, 1644 that extend downward from the rear hopper joint area 1552. The first frame member 1642 extends from one end at the high point of the rear hopper joint area 1552 adjacent the first side wall portion 1544 to an opposite end at the low point of the rear hopper joint area. Likewise the second frame member 1644 extends from one end at the high point of the rear hopper joint area 1552 adjacent the second side wall portion 1546 to an opposite end at the low point of the rear hopper joint area. The ends of the frame members 1642, 1644 located at the low point of the rear hopper joint area 1552 are joined together at a joint 1646 located about midway between the first and second side wall portions 1544, 1546, where stresses on the tank 1520 caused by internal pressures are thought to be low. The joint 1646 can be formed by welding the frame members 1642, 1644 together or by any other suitable method. In addition, the frame members 1642, 1644 can be joined to the tank 1520 by welding or any other suitable method.

In the illustrated embodiment, the external frames 1620, 1622 are positioned at locations that are thought to have a minimal impact on the drag coefficient of the trailer 1510 in use. The front external frame 1620 extends externally of the tank 1620 at a location that is substantially covered by a tractor (not shown) connected to the trailer 1510 and/or a trailer nosecone 1650 (FIG. 15). When a tractor pulls the trailer 1510 in the forward direction, the rear external frame 1622 is located in a low pressure zone in the immediate wake of the tank 1520, where it causes minimal drag. Thus, the external frames 1620, 1622 suitably reinforce the bottom of the tank 1620 at the front and rear hopper joint areas 1550, 1552 without obstructing the flow of materials into the hoppers 1524 or significantly increasing the drag coefficient of the trailer 1510.

As can be seen, the frames 1560, 1562, 1564, 1620, 1622 provide a lightweight structure for reinforcing the tank 1520 against internal pressures. The low weight of the reinforcing structure enhances the fuel efficiency of the trailer. In addition, the placement of the frames 1560, 1562, 1564, 1620, 1622 in the interior 1532 of the tank 1534 and in covered external locations lowers the drag coefficient of the trailer 1510. Thus, it is believed that several aspects of the illustrated tank structure improve the fuel efficiency of the trailer 1510 and lower the cost of using the trailer to transport material without compromising the strength of the tank 1520.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claim.

What is claimed is:

1. A pneumatic tank trailer comprising:
    a tank having front and rear ends spaced apart along a longitudinal axis, the tank comprising:
        a plurality of hoppers each having a top end portion and bottom end portion, the top end portions of adjacent hoppers arranged next to each other and defining hopper joint areas, the bottom end portions of the hoppers being spaced apart along the longitudinal axis of the tank,
        a tank wall extending along the longitudinal axis of the tank and defining an interior of the tank, the tank wall including opposite first and second side wall portions and a top wall portion extending between the first and second side wall portions, the first and second side wall portions of the tank having bottom edge portions that are joined to the top end portions of the hoppers, and
        a plurality of internal frames joined to the tank in spaced apart relationship along the longitudinal axis of the tank to support the tank against internal pressures therein, each internal frame comprising a bottom portion joined to a respective hopper joint area of the tank, opposite first and second side portions joined to the first and second side wall portions of the tank, respectively, and a cross joist portion extending between the opposite side wall portions of the tank in spaced apart relationship with the bottom portion of the respective internal frame and the top wall portion of the tank; and
    a carriage connected to and supporting the tank for movement over a road;
    wherein the bottom portion, the opposite first and second side portions, and the cross joist portion of each frame extend substantially in the same plane.

2. A pneumatic tank trailer as set forth in claim 1 wherein the top wall portion of the tank and bottom end portion of the hoppers are vertically spaced apart by a tank height, the cross joist portion of each internal frame being vertically spaced apart from the bottom end portion of the hoppers by at least two-thirds of the tank height.

3. A pneumatic tank trailer as set forth in claim 1 wherein each internal frame further comprises a top portion joined to the top wall portion of the tank, the top portion being spaced apart from the cross joist portion of the respective frame.

4. A pneumatic tank trailer as set forth in claim 1 wherein each of the internal frames comprises a plurality of frame members that are joined together to form the respective internal frame.

5. A pneumatic tank trailer as set forth in claim 4 wherein the frame members of each internal frame are welded together.

6. A pneumatic tank trailer as set forth in claim 4 wherein each hopper joint area has a curved shape extending from a first high point adjacent the first side wall portion of the tank to a low point about midway between the first and second side wall portions of the tank to a second high point adjacent the second side wall portion of the tank.

7. A pneumatic tank trailer as set forth in claim 6 wherein the plurality of frame members of each internal frame include frame members having adjoining ends adjacent the first and second high points of the respective hopper joint area.

8. A pneumatic tank trailer as set forth in claim 7 wherein said adjoining ends are spaced apart between the first and second high points of the respective hopper joint area and the respective cross joist portion.

9. A pneumatic tank trailer as set forth in claim 4 wherein the plurality of frame members of each of the internal frames includes a top frame member extending along the top wall portion of the tank and having a first end joined to another of the plurality of frame members adjacent first wall portion and second end joined to another of the plurality of frame members adjacent the second wall portion.

10. A pneumatic tank trailer as set forth in claim 9 wherein said first and second ends of the top frame member are joined to a central frame member.

11. A pneumatic tank trailer as set forth in claim 10 wherein the central frame member forms the cross joist portion.

12. A pneumatic tank trailer comprising:
    a carriage for movement over a road; and
    a tank connected to and supported by the carriage and having front and rear ends spaced apart along a longitudinal axis, the tank comprising:
        a plurality of hoppers each having a top end portion and bottom end portion, the top end portions of adjacent hoppers being arranged next to each other and defining hopper joint areas, the bottom end portions of the hoppers being spaced apart along the longitudinal axis of the tank, and
        a tank wall extending along the longitudinal axis of the tank and defining an interior of the tank, the tank wall including opposite first and second side wall portions and a top wall portion extending between the first and second side wall portions, the first and second side wall portions of the tank having bottom edge portions that are joined to the top end portions of the hoppers, and
        a plurality of internal frames joined to the tank in spaced apart relationship along the longitudinal axis of the tank to support the tank against internal pressures therein, each of the internal frames being longitudinally aligned with a respective hopper joint area and extending circumferentially around the tank interior, each internal frame having a bottom portion joined to the respective hopper joint area, first and second side portions joined to the first and second wall portions, respectively, and a top portion joined to the top wall portion, each internal frame comprising a plurality of frame members that are joined together to form the respective internal frame, at least some of the internal frames extending circumferentially around the tank interior and continuously contacting the tank wall and respective hopper joint area.

13. A pneumatic tank trailer as set forth in claim 12 wherein each internal frame comprises a plurality of joints at which two of the respective frame members are joined together, the joints being circumferentially spaced apart around the tank interior at locations of the tank that experience low stress when an internal pressure is exerted on the tank.

14. A pneumatic tank trailer as set forth in claim 12 wherein each internal frame comprises a bottom frame member forming the bottom portion of the respective internal frame.

15. A pneumatic tank trailer as set forth in claim 14 wherein each hopper joint area has a curved shape extending from a first high point adjacent the first side wall portion of the tank to a low point about midway between the first and second side wall portions of the tank to a second high point adjacent the second side wall portion of the tank, each bottom frame member having first and second ends located adjacent the first and second high points of the respective hopper joint area, respectively.

16. A pneumatic tank trailer as set forth in claim 15 wherein each internal frame further comprises a central frame member, the central frame member having a first end joined to the first end of the bottom frame member at a joint located adjacent the first high point of the respective hopper joint area and a second end joined to the second end of the bottom frame member at a joint located adjacent the second high point of the respective hopper joint area.

17. A pneumatic tank trailer as set forth in claim 16 wherein each internal frame member comprises a cross joist portion extending between the side portions thereof in spaced apart relationship with the top and bottom portions thereof, the central frame member forming the cross joist portion of the respective internal frame.

18. A pneumatic tank trailer as set forth in claim 16 wherein each internal frame comprises a top frame member that is joined to the central frame member thereof and forms the top portion of the respective frame.

19. A pneumatic tank trailer as set forth in claim 12 wherein the plurality of frame members are joined together by welding.

20. A pneumatic tank trailer comprising:
a carriage for movement over a road; and
a tank connected to and supported by the carriage and having front and rear ends spaced apart along a longitudinal axis, the tank comprising:
a plurality of hoppers including a front hopper adjacent the front end of the tank and a rear hopper adjacent the rear end of the tank, each of the hoppers having a top end portion and bottom end portion, the top end portions of adjacent hoppers arranged next to one another and defining hopper joint areas such that the bottom end portions of the hoppers are spaced apart along the longitudinal axis of the tank; and
a tank wall extending along the longitudinal axis of the tank and defining an interior of the tank, the tank wall including a front wall portion defining the front end of the tank, a rear wall portion defining the rear end of the tank, opposite first and second side wall portions, and a top wall portion extending between the first and second side wall portions, the first and second side wall portions of the tank having bottom edge portions that are joined to the top end portions of the hoppers, the front wall portion being joined to the top end portion of the front hopper at a front joint area and the rear wall portion being joined to the top end portion of the rear hopper at a rear joint area;
an internal frame for each hopper joint area, each internal frame being joined to the tank in longitudinal alignment with the hopper joint area and extending circumferentially around the tank interior;
a front frame joined to the tank in longitudinal alignment with the front joint area and extending circumferentially around the tank interior, the front frame having an internal portion extending inside the tank along the first side wall portion, top wall portion, and second side wall portion of the tank wall and an external portion extending underneath the tank along the front joint area; and a rear frame joined to the tank in longitudinal alignment with the rear joint area and extending circumferentially around the tank interior, the rear frame having an internal portion extending inside the tank along the first side wall portion, top wall portion, and second side wall portion of the tank wall and an external portion extending underneath the tank along the rear joint area.

* * * * *